US012545037B2

(12) United States Patent
Arai et al.

(10) Patent No.: US 12,545,037 B2
(45) Date of Patent: Feb. 10, 2026

(54) PRINTING APPARATUS, COMPUTER-READABLE STORAGE MEDIUM, AND METHOD FOR IMPROVING THROUGHPUT WHEN DIVIDING PRINT MEDIUM

(71) Applicant: BROTHER KOGYO KABUSHIKI KAISHA, Nagoya (JP)

(72) Inventors: Yusuke Arai, Nagoya (JP); Isao Kobayashi, Nagoya (JP); Yoshimitsu Taniguchi, Tajimi (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 303 days.

(21) Appl. No.: 18/299,884

(22) Filed: Apr. 13, 2023

(65) Prior Publication Data

US 2023/0331009 A1 Oct. 19, 2023

(30) Foreign Application Priority Data

Apr. 15, 2022 (JP) ................................. 2022-067865

(51) Int. Cl.
*B41J 11/66* (2006.01)
*B41J 13/00* (2006.01)
*G03G 15/00* (2006.01)

(52) U.S. Cl.
CPC ........... *B41J 11/663* (2013.01); *B41J 13/009* (2013.01); *G03G 15/6529* (2013.01)

(58) Field of Classification Search
CPC .... B41J 11/663; B41J 13/009; G03G 15/6529
See application file for complete search history.

(56) References Cited

U.S. PATENT DOCUMENTS

2014/0306395 A1* 10/2014 Suzuki .................. B65H 35/04 270/52.02
2017/0344861 A1* 11/2017 Shirasaka .................. B41J 5/32

FOREIGN PATENT DOCUMENTS

JP 2018-186448 A 11/2018
WO WO-2020231443 A1 * 11/2020 ............ B41J 11/706

* cited by examiner

*Primary Examiner* — Scott A Richmond
(74) *Attorney, Agent, or Firm* — Kenealy Vaidya LLP

(57) ABSTRACT

A printing apparatus includes a divider disposed downstream of a print engine in a conveyance direction, and a controller. The controller causes a conveyor to convey a print medium until a planned dividing position of the print medium reaches a dividing position of the divider, when a first conveyance amount is larger than a second conveyance amount. The first conveyance amount corresponds to a print width for a printing process by the print engine. The second conveyance amount is calculated using a distance between a reference position and the dividing position and a distance between the reference position and the planned dividing position. After the planned dividing position of the print medium reaches the dividing position, the controller causes the divider to divide the print medium into first and second print media. The controller causes the conveyor to convey the second sheet to a printing position.

10 Claims, 19 Drawing Sheets

PRINTING APPARATUS, COMPUTER-READABLE STORAGE MEDIUM, AND METHOD FOR IMPROVING THROUGHPUT WHEN DIVIDING PRINT MEDIUM

REFERENCE TO RELATED APPLICATIONS

This application claims priority from Japanese Patent Application No. 2022-067865 filed on Apr. 15, 2022. The entire content of the priority application is incorporated herein by reference.

BACKGROUND ART

In recent years, printing apparatuses, such as image forming apparatuses, have been known that include a cutter for cutting a print medium. In addition, a printing apparatus has been disclosed that is configured to perform a printing process on a print medium and then a cutting process to cut the print medium with a cutter, thereby producing and discharging two print media.

DESCRIPTION

However, with respect to the known printing apparatuses as described above, there has been no disclosure of technologies for improving throughput when performing a dividing process (including the cutting process) to divide a print medium into two print media.

Aspects of the present disclosure are advantageous for providing one or more improved techniques for a printing apparatus that make it possible to improve throughput while suppressing a reduction in printing performance even when a dividing process is performed.

According to aspects of the present disclosure, a printing apparatus is provided, which includes a conveyor, a print engine, a divider, and a controller. The conveyor is configured to convey a print medium in a conveyance direction. The print engine is configured to perform printing based on print data contained in print job on the print medium conveyed in the conveyance direction by the conveyor. The divider is disposed downstream of the print engine in the conveyance direction. The divider is configured to divide the print medium conveyed through the print engine by the conveyor. The controller is configured to cause the conveyor to convey the print medium until a planned dividing position of the print medium to be divided reaches a dividing position for the divider to divide the print medium, when a first conveyance amount is larger than a second conveyance amount. The first conveyance amount corresponds to a print width for an individual printing process by the print engine in the conveyance direction. The second conveyance amount is calculated using a distance between a predetermined reference position and the dividing position of the divider and a distance between the predetermined reference position and the planned dividing position of the print medium. The controller is further configured to, after conveying the print medium until the planned dividing position of the print medium reaches the dividing position of the divider, cause the divider to divide the print medium into a first sheet and a second sheet. The controller is further configured to cause the conveyor to convey the second sheet after the division of the print medium, to a printing position that is a print start position for a printing process by the print engine.

According to aspects of the present disclosure, further provided is a printing apparatus that includes a conveyor, a print engine, a divider, and a controller. The conveyor is configured to convey a print medium in a conveyance direction. The print engine is configured to perform printing based on print data contained in print job on the print medium conveyed in the conveyance direction by the conveyor. The print engine includes a liquid ejection head having a plurality of nozzles arranged along the conveyance direction. The liquid ejection head is configured to eject liquid from at least one of the plurality of nozzles onto the print medium. The divider is disposed downstream of the print engine in the conveyance direction. The divider is configured to divide the print medium conveyed through the print engine by the conveyor. The controller is configured to determine, as an ejection nozzle to eject the liquid onto the print medium, at least one nozzle selected from a group consisting of a first nozzle included in a first area, and a second nozzle included in a second area located downstream of the first area in the conveyance direction, among the plurality of nozzles. The controller is further configured to cause the conveyor to convey the print medium until a planned dividing position of the print medium to be divided reaches a dividing position for the divider to divide the print medium, when a first conveyance amount is larger than a second conveyance amount. The first conveyance amount corresponds to a print width for an individual printing process by the print engine in the conveyance direction. The second conveyance amount is calculated using a distance between a predetermined reference position and the dividing position of the divider and a distance between the predetermined reference position and the planned dividing position of the print medium. The controller is further configured to, after conveying the print medium until the planned dividing position of the print medium reaches the dividing position of the divider, cause the divider to divide the print medium into a first sheet and a second sheet. The controller is further configured to cause the print engine to eject the liquid from the determined ejection nozzle, thereby performing printing based on print data on the print medium.

According to aspects of the present disclosure, further provided is a non-transitory computer-readable storage medium storing computer-readable instructions executable by a processor of a printing apparatus. The printing apparatus includes a conveyor, a print engine, and a divider. The divider is disposed downstream of the print engine in a conveyance direction. The instructions are configured to, when executed by the processor, cause the printing apparatus to cause the conveyor to convey a print medium in the conveyance direction until a planned dividing position of the print medium to be divided reaches a dividing position for the divider to divide the print medium, when a first conveyance amount is larger than a second conveyance amount. The first conveyance amount corresponds to a print width for an individual printing process by the print engine in the conveyance direction. The second conveyance amount is calculated using a distance between a predetermined reference position and the dividing position of the divider and a distance between the predetermined reference position and the planned dividing position of the print medium. The instructions are further configured to, when executed by the processor, cause the printing apparatus to, after conveying the print medium until the planned dividing position of the print medium reaches the dividing position of the divider, cause the divider to divide the print medium into a first sheet and a second sheet. The instructions are further configured to, when executed by the processor, cause the printing apparatus to cause the conveyor to convey the second sheet after the division of the print medium, to a printing position that is a print start position for a printing process by the print engine.

According to aspects of the present disclosure, further provided is a non-transitory computer-readable storage medium storing computer-readable instructions executable by a processor of a printing apparatus. The printing apparatus includes a conveyor, a print engine, and a divider. The print engine includes a liquid ejection head having a plurality of nozzles arranged along a conveyance direction. The divider is disposed downstream of the print engine in the conveyance direction. The instructions are configured to, when executed by the processor, cause the printing apparatus to determine, as an ejection nozzle to eject the liquid onto a print medium, at least one nozzle selected from a group consisting of a first nozzle included in a first area, and a second nozzle included in a second area located downstream of the first area in the conveyance direction, among the plurality of nozzles. The instructions are further configured to, when executed by the processor, cause the printing apparatus to cause the conveyor to convey the print medium in the conveyance direction until a planned dividing position of the print medium to be divided reaches a dividing position for the divider to divide the print medium, when a first conveyance amount is larger than a second conveyance amount. The first conveyance amount corresponds to a print width for an individual printing process by the print engine in the conveyance direction. The second conveyance amount is calculated using a distance between a predetermined reference position and the dividing position of the divider and a distance between the predetermined reference position and a planned dividing position of the print medium. The instructions are further configured to, when executed by the processor, cause the printing apparatus to, after conveying the print medium until the planned dividing position of the print medium reaches the dividing position of the divider, cause the divider to divide the print medium into a first sheet and a second sheet. The instructions are further configured to, when executed by the processor, cause the printing apparatus to cause the print engine to eject the liquid from the determined ejection nozzle, thereby performing printing based on print data on the print medium.

According to aspects of the present disclosure, further provided is a method implementable on a controller of a printing apparatus. The printing apparatus includes a conveyor, a print engine, and a divider. The divider is disposed downstream of the print engine in a conveyance direction. The method includes causing the conveyor to convey a print medium in the conveyance direction until a planned dividing position of the print medium to be divided reaches a dividing position for the divider to divide the print medium, when a first conveyance amount is larger than a second conveyance amount. The first conveyance amount corresponds to a print width for an individual printing process by the print engine in the conveyance direction. The second conveyance amount is calculated using a distance between a predetermined reference position and the dividing position of the divider and a distance between the predetermined reference position and the planned dividing position of the print medium. The method further includes causing, after conveying the print medium until the planned dividing position of the print medium reaches the dividing position of the divider, the divider to divide the print medium into a first sheet and a second sheet. The method further includes causing the conveyor to convey the second sheet after the division of the print medium, to a printing position that is a print start position for a printing process by the print engine.

According to aspects of the present disclosure, further provided is a method implementable on a controller of a printing apparatus. The printing apparatus includes a conveyor, a print engine, and a divider. The print engine includes a liquid ejection head having a plurality of nozzles arranged along a conveyance direction. The divider is disposed downstream of the print engine in the conveyance direction. The method includes determining, as an ejection nozzle to eject liquid onto a print medium, at least one nozzle selected from a group consisting of a first nozzle included in a first area, and a second nozzle included in a second area located downstream of the first area in the conveyance direction, among the plurality of nozzles. The method further includes causing the conveyor to convey the print medium in the conveyance direction until a planned dividing position of the print medium to be divided reaches a dividing position for the divider to divide the print medium, when a first conveyance amount is larger than a second conveyance amount. The first conveyance amount corresponds to a print width for an individual printing process by the print engine in the conveyance direction. The second conveyance amount is calculated using a distance between a predetermined reference position and the dividing position of the divider and a distance between the predetermined reference position and a planned dividing position of the print medium. The method further includes causing, after conveying the print medium until the planned dividing position of the print medium reaches the dividing position of the divider, the divider to divide the print medium into a first sheet and a second sheet. The method further includes causing the print engine to eject the liquid from the determined ejection nozzle, thereby performing printing based on print data on the print medium.

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

First Illustrative Embodiment

Figure 1:
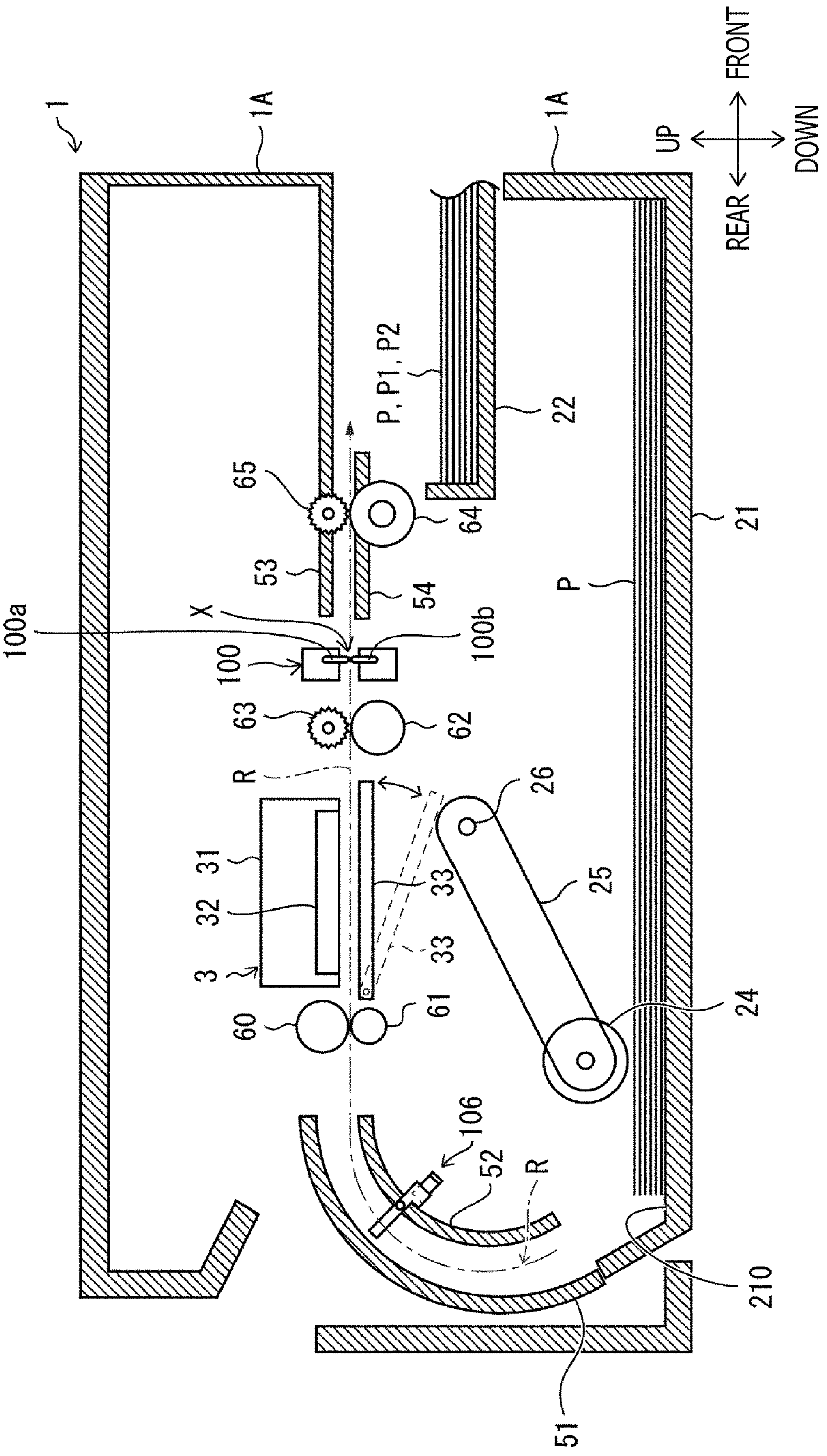
FIG. 1 is a cross-sectional side view schematically showing an internal structure of a printing apparatus.
Figure 2:
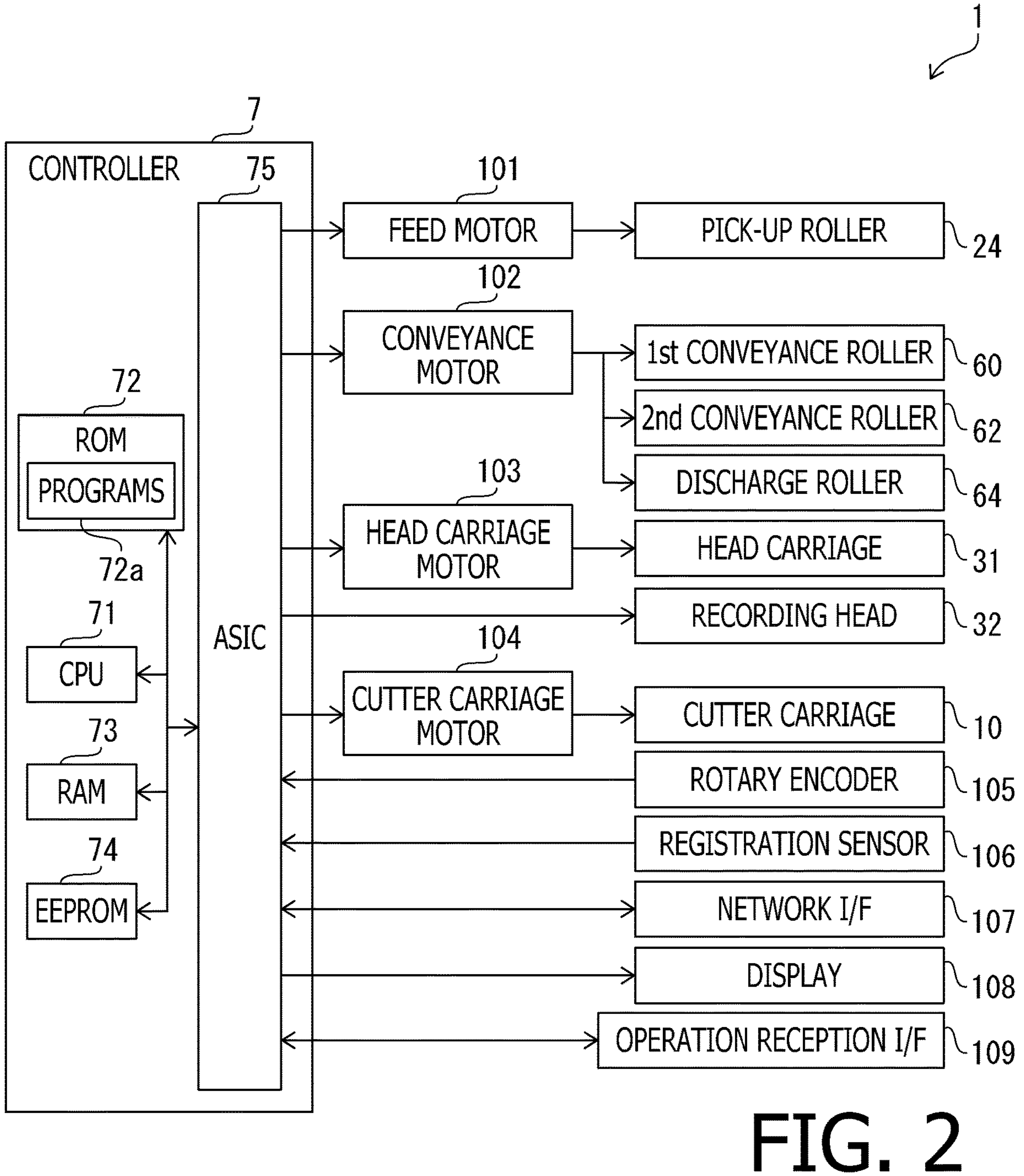
FIG. 2 is a block diagram showing an electrical configuration of the printing apparatus.

A first illustrative embodiment according to aspects of the present disclosure is described below with reference to FIGS. 1 and 2. FIG. 1 is a cross-sectional side view showing an internal structure of a printing apparatus 1 of the first illustrative embodiment. FIG. 2 is a block diagram showing an electrical configuration of the printing apparatus 1. In the following description, a color printer configured to perform a printing process to form a full-color image is shown as an example of the printing apparatus 1 according to aspects of the present disclosure. However, examples of the printing apparatus 1 are not limited to this, but may include a monochrome printer configured to perform a printing process to form a monochrome image.

The printing apparatus 1 is, for instance, a multi-function peripheral (hereinafter referred to as an "MFP") has a plurality of functions such as a scanning function, a printing function, a copying function, and a facsimile function. In the following description, a vertical direction and a front-to-rear direction of the printing apparatus 1 are defined on the basis of a state shown in FIG. 1 in which the printing apparatus 1 is installed ready for use.

The printing apparatus 1 is an inkjet printer configured to perform a printing process, for instance, by ejecting ink onto a printing sheet P based on print data specified by a print job. In another instance, the printing apparatus 1 may be a laser printer configured to record an image on the printing sheet P, for instance, in an electrophotographic method. The printing sheet P may be an example of a "print medium" according to aspects of the present disclosure. However, examples of the "print medium" are not limited to paper media such as the printing sheet P, but may include resin media made of plastic, such as OHP sheets and transparencies.

The following explanation is provided with an example case in which the printing sheet P is completely cut and divided into two sheets, i.e., a first printing sheet and a second printing sheet by a cutting mechanism 100. However, aspects of the present disclosure are not limited to this. For instance, in order to apply a crease process to the printing sheet P, the cutting mechanism 100 may be configured to perforate the printing sheet P along a boundary line between the first printing sheet and the second printing sheet, thereby dividing the printing sheet P without completely cutting the printing sheet P into the first printing sheet and the second printing sheet.

Configuration of Printing Apparatus

As shown in FIG. 1, the printing apparatus 1 includes a feed tray 21 and a discharge tray 22. The feed tray 21 is a case for storing printing sheets P and has an open upper surface. The feed tray 21 has a placement section 210 and accommodates the printing sheets P placed on the placement section 210. The size of the printing sheets P is, for instance, A4 size. The feed tray 21 and the discharge tray 22 are configured to be removably attached to the printing apparatus 1 by being moved along the front-to-rear direction with respect to an opening (not shown) formed in the front of the printing apparatus 1.

The printing apparatus 1 further includes a pick-up roller 24, a conveyance path R, a first conveyance roller 60, a print engine 3, a second conveyance roller 62, a discharge roller 64, and the cutting mechanism 100. In the printing apparatus 1, each element is contained in a housing 1A that forms an outer container. Hereinafter, the pick-up roller 24, the first conveyance roller 60, the second conveyance roller 62, and the discharge roller 64 may be collectively referred to as a "conveyor." In other words, the after-mentioned conveyor configured to convey the printing sheet P in a conveyance direction may include the pick-up roller 24, the first conveyance roller 60, the second conveyance roller 62, and the discharge roller 64.

The pick-up roller 24 is configured to feed the printing sheets P stored in the feed tray 21 to the conveyance path R. The feed roller 24 is rotatably supported by a distal end of a pick-up arm 25. The pick-up arm 25 is rotatably supported by a shaft 26 that is supported by a frame of the printing apparatus 1. The pick-up arm 26 is rotated and urged toward the feed tray 21 by its own weight or by an elastic force from, e.g., a spring.

The pick-up roller 24 is driven to rotate in a forward rotational direction by a feed motor 101 (see FIG. 2). As the pick-up roller 24 rotates in the forward rotational direction, the printing sheets P stored in the feed tray 21 are fed to the conveyance path R on a sheet-by-sheet basis. The printing sheet P fed to the conveyance path R is conveyed in the conveyance direction, that is, a direction from the rear toward the front of the printing apparatus 1.

The conveyance path R is a space formed by guide members 51, 52, 53, and 54, and the print engine 3. The conveyance path R extends upward from a rear end portion of the feed tray 21, curves in an area defined by the guide members 51 and 52, passes through a position corresponding to the print engine 3, extends linearly in an area defined by the guide members 53 and 54, and leads to the discharge tray 22.

The first conveyance roller 60 is disposed upstream of the print engine 3 in the conveyance direction on the conveyance path R. A pinch roller 61 is disposed in a position to face a lower portion of the first conveyance roller 60. The first conveyance roller 60 is driven by a conveyance motor 102 (see FIG. 2). The pinch roller 61 rotates with the rotation of the first conveyance roller 60. As the first conveyance roller 60 and the pinch roller 61 each rotate in a forward rotational direction, the printing sheet P is conveyed to the print engine 3 while being pinched between the first conveyance roller 60 and the pinch roller 61. A rotational force from the conveyance motor 102 is transmitted to the second conveyance roller 62 and the discharge roller 64 via a transmission mechanism (not shown). Namely, the second conveyance roller 62 and the discharge roller 64 are each driven by the conveyance motor 102.

The print engine 3 is disposed between the first conveyance roller 60 and the second conveyance roller 62 in the conveyance direction on the conveyance path R. The print engine 3 is configured to perform printing on the printing sheet P according to print data contained in a print job. The print engine 3 includes a head carriage 31, a recording head 32, and a platen 33. The recording head 32 is mounted on the head carriage 31. As will be described in detail later, a lower surface of the recording head 32 forms an after-mentioned nozzle surface on which a plurality of nozzles are provided. The recording head 32 is configured to eject ink droplets as liquid from each of the plurality of nozzles by vibrating a corresponding vibration element such as a piezoelectric element.

The platen 33 is a rectangular plate-shaped member configured to support a printing sheet P placed thereon. In the print engine 3, the recording head 32 selectively ejects ink droplets while the head carriage 31 is moving relative to the printing sheet P supported by the platen 33, thereby forming an image according to print data on the printing sheet P.

The platen 33 is disposed to be rotatable between a first position (see a solid line in FIG. 1) in which the platen 33 is parallel to the conveyance path R, and a second position (see a dashed line in FIG. 1) in which the platen 33 is rotated downward by a particular angle from the first position. The platen 33 is in the first position when the printing sheet P is being conveyed and when printing is being performed. On the other hand, when a problem such as a paper jam has occurred in which the printing sheet P is stuck, the user may place the platen 33 in the second position to remove the jammed printing sheet P.

The head carriage 31 is configured to reciprocate along a scanning direction in response to receiving a driving force transmitted from a head carriage motor 103 (see FIG. 2). The scanning direction is orthogonal to the vertical direction and the front-to-rear direction, and is parallel to the after-mentioned nozzle surface of the recording head 32 and orthogonal to the conveyance direction for the printing sheet P. In other words, the scanning direction is a width direction of the printing sheet P that is perpendicular to a flat surface on which FIG. 1 is drawn.

In the printing apparatus 1, a controller 7 (see FIG. 2) causes, in printing on the printing sheet P, the recording head 32 to eject ink droplets from the nozzles while moving the head carriage 31 in the scanning direction in a state where the conveyance of the printing sheet P is stopped. Then, the controller 7 repeatedly performs a printing process and a line feed process. The printing process is a process to cause the recording head 32 to perform printing based on print data corresponding to a particular print width, on the printing sheet P. The line feed process is a process to drive the first conveyance roller 60 and the second conveyance roller 62 to convey the printing sheet P by a particular line feed amount.

Figure 3:
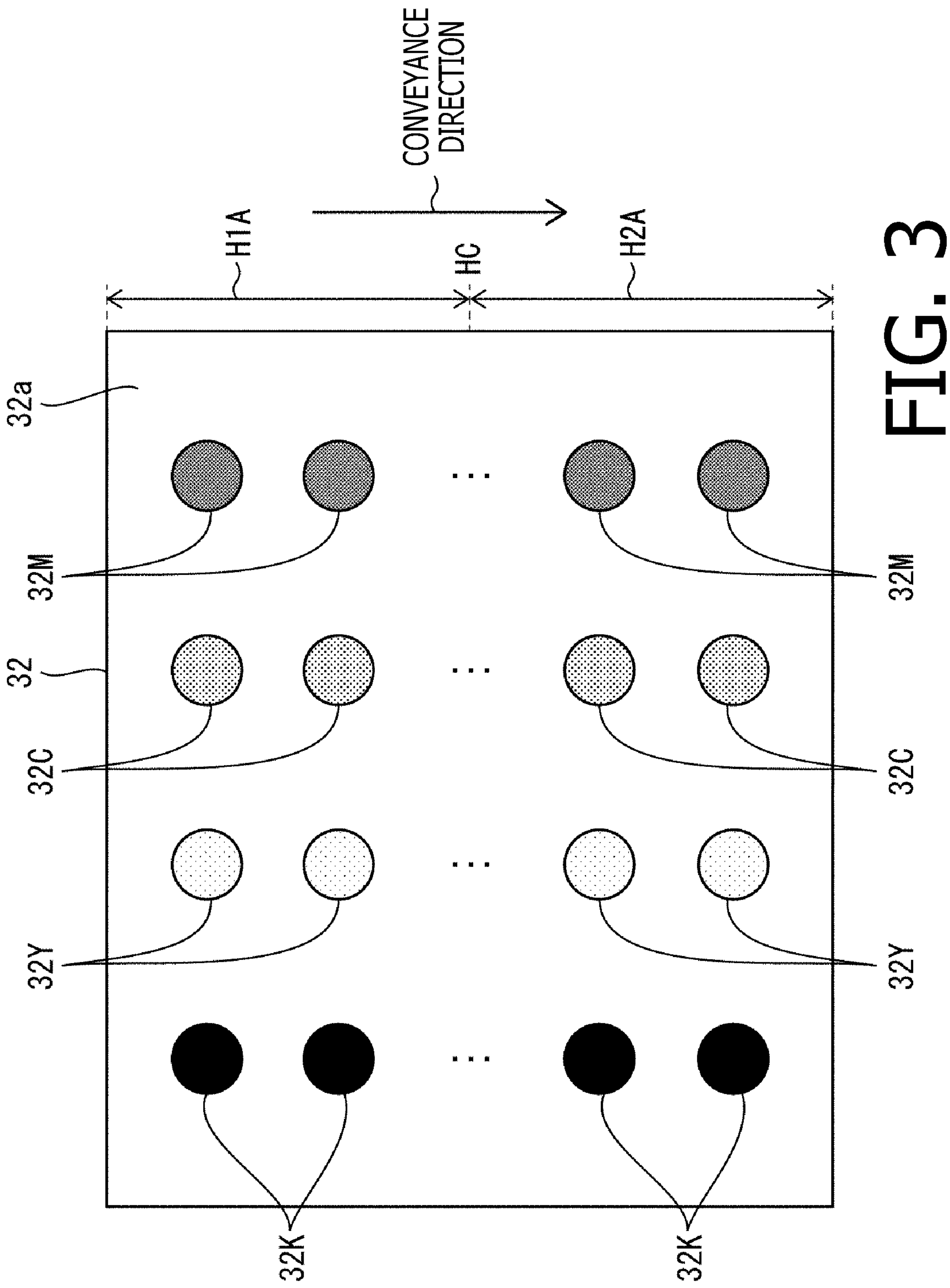
FIG. 3 shows an example of a configuration of a recording head.

Here, referring to FIG. 3, a specific explanation of the recording head 32 will be provided. FIG. 3 illustrates an example configuration of the recording head 32 shown in FIG. 1. FIG. 3 shows a configuration of a nozzle surface 32*a* of the recording head 32 as viewed up from a lower side of the printing apparatus 1.

In FIG. 3, the recording head 32 is an example of a liquid ejection head configured to eject liquid onto the printing sheet P. In the recording head 32, on the nozzle surface 32*a* that faces the printing sheet P, a plurality of liquid ejection openings are arranged that include black nozzles 32K to eject black ink drops, yellow nozzles 32Y to eject yellow ink drops, cyan nozzles 32C to eject cyan ink drops, and magenta nozzles 32M to eject magenta ink drops. For each type of nozzles of the nozzles 32K, 32Y, 32C, and 32M, a plurality of nozzles are aligned along the conveyance direction. In the following description, the nozzles 32K, 32Y, 32C, and 32M may be collectively referred to as the "nozzles 32N."

Specifically, a plurality of nozzles 32N are provided, for instance, in each of a first area H1A and a second area H2A that are located upstream and downstream, respectively, of a center position HC as a boundary therebetween in the conveyance direction. Each of the plurality of nozzles 32N is configured to serve as an ejection nozzle to eject ink droplets onto the printing sheet P according to instructions from the controller 7.

In an after-mentioned second illustrative embodiment, at least one of the plurality of nozzles 32N included in the first area H1A is selected and determined as ejection nozzle(s) by the controller 7. Further, in an after-mentioned third illustrative embodiment, at least one of the plurality of nozzles 32N included in the second area H2A is selected and determined as ejection nozzle(s) by the controller 7. A length, in the conveyance direction on the nozzle surface 32A, of the at least one nozzle 32N determined as the ejection nozzle(s) is a print width for an individual printing process by the print engine 3.

In the above explanation, as shown in FIG. 3, the configuration in which the nozzles 32N for each color of nozzles 32K, 32Y, 32C, or 32M are aligned in a row has been described. However, aspects of the present disclosure are not limited to this, but may include a configuration in which the nozzles 32N for each color of nozzles 32K, 32Y, 32C, or 32M are arranged in two or more rows.

Referring back to FIG. 1, the second conveyance roller 62 is disposed downstream of the print engine 3 in the conveyance direction on the conveyance path R. A spur roller 63 is disposed in a position to face an upper portion of the second conveyance roller 62. As described above, the second conveyance roller 62 is driven by the conveyance motor 102 (see FIG. 2). The spur roller 63 is configured to rotate with the rotation of the second conveyance roller 62. As the second conveyance roller 62 and the spur roller 63 each rotate in a forward direction, the printing sheet P is conveyed to the cutting mechanism 100 while being pinched between the second conveyance roller 62 and the spur roller 63.

The cutting mechanism 100 is disposed downstream of the print engine 3 in the conveyance direction on the conveyance path R. Specifically, the cutting mechanism 100 is located between the second conveyance roller 62 and the discharge roller 64. The cutting mechanism 100 is a known cutter mechanism and includes two blades, i.e., an upper blade 100*a* and a lower blade 100*b*, and a cutter carriage 10 (see FIG. 2). The cutting mechanism 100 is configured to perform a cutting process with the blades 100*a* and 100*b* as cutting blades (cutters), thereby cutting the printing sheet P.

Specifically, the cutting mechanism 100 is configured to cut the printing sheet P along the width direction by moving the cutter carriage 10 in the width direction of the printing sheet P using a rotational force from a cutter carriage motor 104 (see FIG. 2). Thereby, the printing sheet P is completely divided into a first printing sheet P1 and a second printing sheet P2, which are opposed to each other in the conveyance direction.

The cutting process is performed by at least one of the blades 100*a* and 100*b* moving with the cutter carriage 10 in response to the cutter carriage motor 104 rotating to move the cutter carriage 10.

In another instance, the cutting mechanism 100 may have only one of the upper and lower blades 100*a* and 100*b*.

The discharge roller 64 is disposed downstream of the cutting mechanism 100 in the conveyance direction on the conveyance path R. A spur roller 65 is disposed in a position to face an upper portion of the discharge roller 64. As described above, the discharge roller 64 is driven by the conveyance motor 102 (see FIG. 2). The spur roller 65 is configured to rotate with the rotation of the discharge roller 64. As the discharge roller 64 and the spur roller 65 each rotate in a forward rotational direction, the printing sheet P, the first printing sheet P1, or the second printing sheet P2 is discharge onto the discharge tray 22 while being pinched between the discharge roller 64 and the spur roller 65. As shown in FIG. 1, the discharge tray 22 is disposed above the feed tray 21. The discharge tray 22 is configured to receive and support the printing sheet P, the first printing sheet P1, or the second printing sheet P2 as discharged by the discharge roller 64.

A registration sensor 106 is disposed upstream of the print engine 3 in the conveyance direction on the conveyance path R. The registration sensor 106 is configured to detect a leading end and a trailing end of the printing sheet P. As the registration sensor 106, various types of sensors may be employed such as an optical sensor and a sensor having an actuator configured to swing when coming into contact with the printing sheet P.

Further, the registration sensor 106 is configured to output an ON signal when the printing sheet P is passing a position of the registration sensor 106 and to output an OFF signal when the printing sheet P is not passing the position of the registration sensor 106. Namely, the registration sensor 106 outputs the ON signal from when the leading end of the print sheet P reaches the position of the registration sensor 106 until when the trailing end of the print sheet P passes the position of the registration sensor 106, and outputs the OFF signal during the other times. The detection signal output from the registration sensor 106 is input into the controller 7.

The first conveyance roller 60 is provided with a rotary encoder 105 (see FIG. 2) that detects the rotation of the first conveyance roller 60. The rotary encoder 105 is configured to output a pulse signal to the controller 7 in response to the rotation of the first conveyance roller 60. The rotary encoder 105 has an encoder disk (not shown) and an optical sensor (not shown). The encoder disk is configured to rotate with the rotation of the first transport roller 60. The optical sensor is configured to read the rotating encoder disk, generate a pulse signal, and output the generated pulse signal to the controller 7. Thereby, as will be described in detail later, the controller 7 performs, based on the pulse signal, a conveyance position determination process for the printing sheet P conveyed along the conveyance path R and a cutting process to cut the printing sheet P by the cutting mechanism 100.

Electrical Configuration of Printing Apparatus

As shown in FIG. 2, the printing apparatus 1 includes, in addition to the aforementioned elements, the controller 7, the feed motor 101, the conveyance motor 102, the head carriage motor 103, and the cutter carriage motor 104. Further, the printing apparatus 1 includes a network I/F ("I/F" is an abbreviation for interface") 107, a display 108, and an operation reception I/F 109.

The controller 7 has a CPU ("CPU" is an abbreviation for "Central Processing Unit") 71, a ROM ("ROM" is an abbreviation for "Read Only Memory") 72, a RAM ("RAM" is an abbreviation for "Random Access Memory") 73, an EEPROM ("EEPROM" is a registered trademark of UNO S.L.) 74, and ASIC 75, which are interconnected by an internal bus. The ROM 72 stores programs 72*a* configured to, when executed by the CPU 71, cause the controller 7 to control various operations. The RAM 73 is used as a storage area for temporarily storing signals and data used by the CPU 71 to execute the programs 72*a*, or as a work area for data processing. In the following description, processes and operations by the controller 7 may be achieved by the CPU 71 executing the programs 72*a* (including after-mentioned control programs) stored in the ROM 72.

The EEPROM 74 stores setting information to be retained even after the printing apparatus 1 is powered off. The EEPROM 74 retains adjustment information in advance, which is included in the setting information. The adjustment information represents an after-mentioned adjustment amount. The controller 7 controls each of the elements included in the printing apparatus 1, such as a conveyor, the print engine 3, and the cutting mechanism 100, based on control programs read out from the ROM 72.

The ASIC 75 is connected with the feed motor 101, the conveyance motor 102, the head carriage motor 103, and the recording head 32. Further, the ASIC 75 is connected with the cutter carriage motor 104, the rotary encoder 105, the registration sensor 106, the network I/F 107, the display 108, and the operation reception I/F 109.

The ASIC 75 supplies drive current to the feed motor 101, the conveyance motor 102, the head carriage motor 103, and the cutter carriage motor 104. The feed motor 101, the conveyance motor 102, the head carriage motor 103, and the cutter carriage motor 104 are DC motors each of which is configured to increase its rotational speed as the supplied drive current increases and to decrease its rotational speed as the supplied drive current decreases. The controller 7 controls the respective rotations of the feed motor 101, the conveyance motor 102, the head carriage motor 103, and the cutter carriage motor 104, for instance, by PWM ("PWM" is an abbreviation for "Pulse Width Modulation") control.

Further, the controller 7 applies drive voltage to the vibration elements of the recording head 32, thereby ejecting ink droplets from the nozzles 32N. The controller 7 detects a rotational amount of the first conveyance roller 60 based on the pulse signal output from the rotary encoder 105. The controller 7 detects that the printing sheet P has passed a contact position where the printing sheet P is in contact with the first conveyance roller 60, based on the detection signal output from the registration sensor 106. Then, the controller 7 estimates a conveyance amount of the printing sheet P conveyed along the conveyance path R based on the pulse signal output from the rotary encoder 105 after the ON signal is output from the registration sensor 106 (details to be described below).

The network I/F 107 is configured to connect with a network such as a LAN ("LAN" is an abbreviation for "Local Area Network") or a USB memory device. Thus, the printing apparatus 1 is connectable with an external device in which a driver for the printing apparatus 1 is incorporated. The printing apparatus 1 is enabled to receive, via the network I/F 107, a print job that includes identification information for identifying the type of the printing sheet P.

The display 108 includes a display panel such as an LCD panel. The display 108 is configured to display particular information in accordance with an instruction from the controller 7. The operation reception I/F 109 is an input device for inputting instructions such as print jobs from the user. The operation reception I/F 109 is configured to accept an instruction input therethrough and output the input instruction to the controller 7. The operation reception I/F 109 includes operable buttons and a touch panel put on the display panel.

Example of Operations by Printing Apparatus

Figure 4:
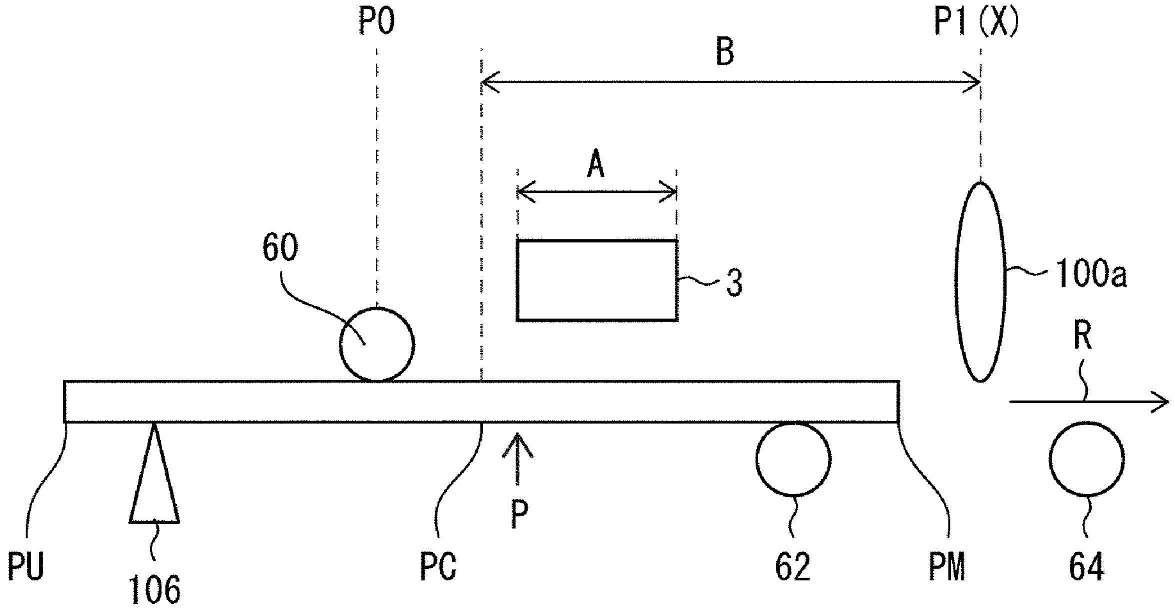
FIG. 4 is an illustration for explaining a conveyance position determination process and a cutting process for a printing sheet by a controller.
Figure 5A:
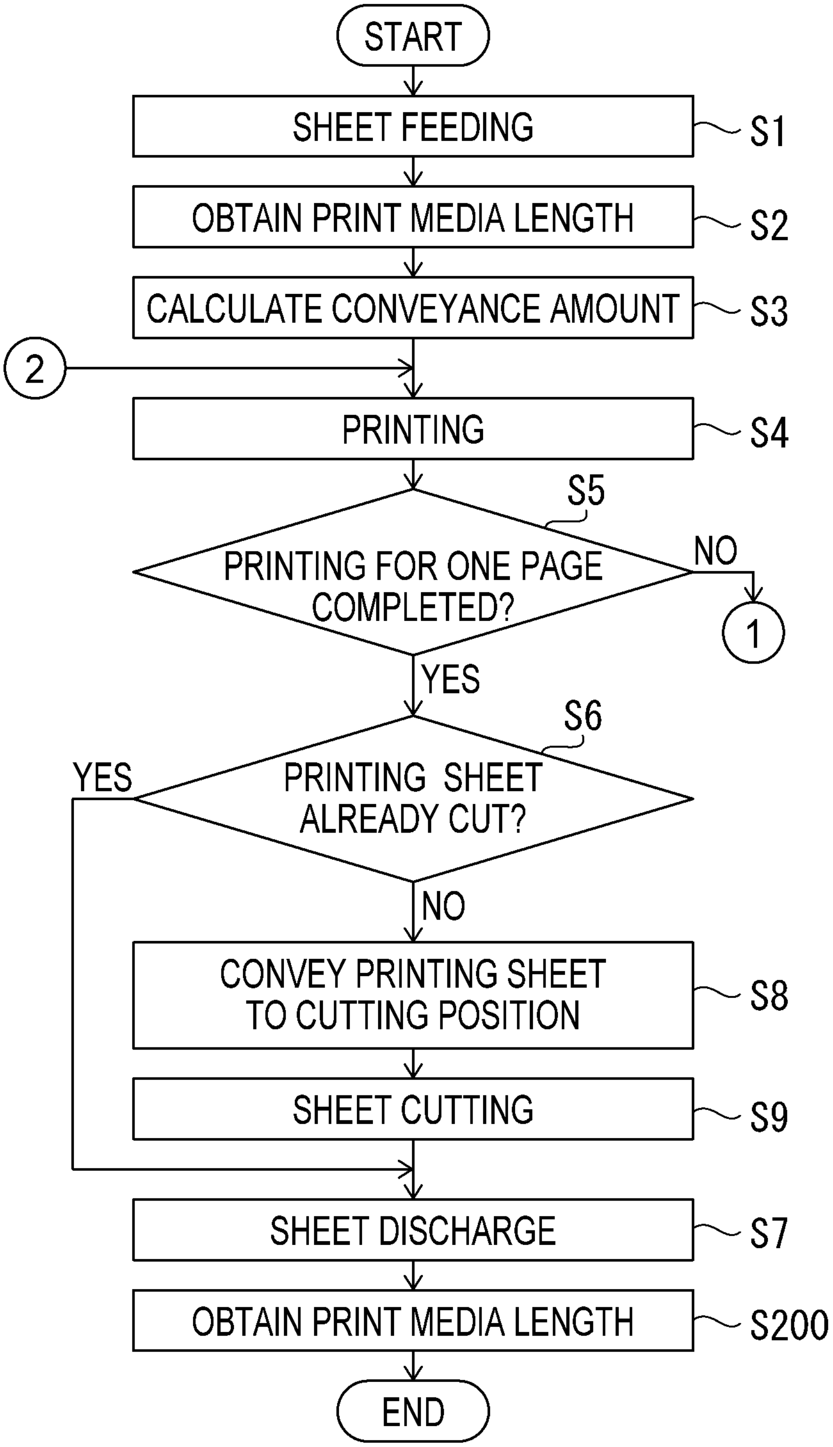
FIGS. 5A and 5B are flowcharts showing an example procedure of basic operations by the printing apparatus.
Figure 5B:
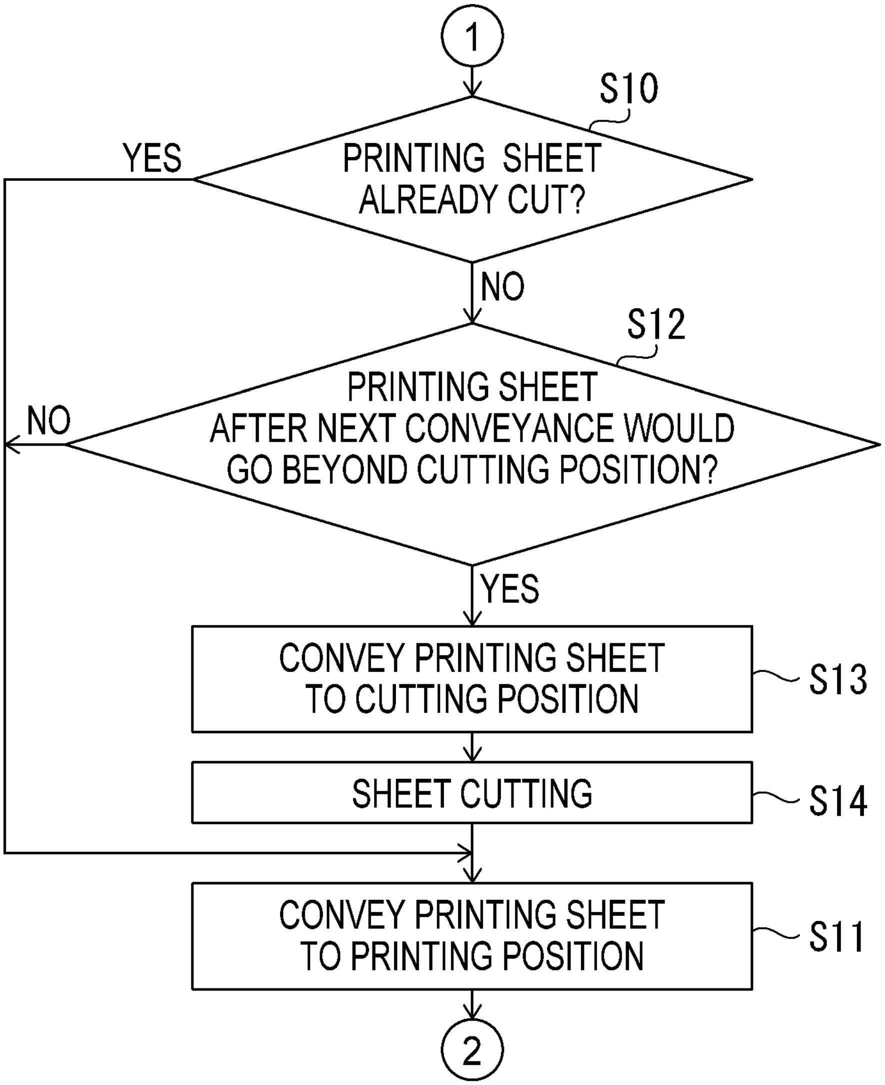

Next, a specific explanation will be provided of an example of operations by the printing apparatus 1 in the first illustrative embodiment with reference to FIGS. 4 to 6. FIG. 4 is an illustration for explaining the conveyance position determination process and the cutting process for the printing sheet P by the controller 7 (see FIG. 2). FIGS. 5A and 5B are flowcharts showing an example procedure of basic operations by the printing apparatus 1. FIGS. 6A to 6F illustrate an example of a sequence of specific operations for the printing sheet P by the printing apparatus 1. The following explanation is provided of an example case in which an A4-size printing sheet P is cut into an A5-size first printing sheet P1 and an A5-size second printing sheet P2 in the cutting process, and a printing process is performed on each of the first printing sheet P1 and the second printing sheet P2.

Conveyance Position Determination Process and Cutting Process for Printing Sheet First, referring to FIG. 4, a specific explanation is provided of the conveyance position determination process and the cutting process for the printing sheet P by the controller 7. It is noted that in FIG. 4, only the blade 100*a* is shown among the blades 100*a* and 100*b* of the cutting mechanism 100.

As shown in FIG. 4, the controller 7 determines a conveyance position of the printing sheet P on the conveyance path R with respect to a predetermined reference position P0 on the conveyance path R. Specifically, for instance, the controller 7 sets the position of the first conveyance roller 60 on the conveyance path R as the reference position P0. The controller 7 detects a rotational amount of the first conveyance roller 60 based on the pulse signal from the rotary encoder 105, thereby determining the position, on the conveyance path R, of a leading end PM of the printing sheet P that has passed the registration sensor 106. Thus, the controller 7 performs the conveyance position determination process to determine a current position of the leading end PM of the printing sheet P on the conveyance path R.

Based on the result of the conveyance position determination process, the controller 7 determines whether to perform the cutting process by the cutting mechanism 100. Specifically, the controller 7 calculates a conveyance amount B for the printing sheet P using the following formula (1).

$$B=Y+Z/2-X+TV1+TV2 \quad \text{Formula (1)}$$

In the formula (1), Y is a distance between the reference position P0 and a cutting position P1(X) where the cutting mechanism 100 cuts the printing sheet P on the conveyance path R. Z is a length (i.e., a print medium length) of the printing sheet P in the conveyance direction. For instance, Z is 297 mm when the printing sheet P is an A4-size sheet. X is a distance between the reference position P0 and the current position of the leading end PM of the printing sheet P. The distance X may be obtained from the value of an accumulated conveyance amount determined based on the output signal from the rotary encoder 105 in a conveyance operation for the printing sheet P. Namely, the distance X may be obtained using the total number of pulses of the pulse signal from the rotary encoder 105. The total number of pulses of the pulse signal from the rotary encoder 105 indicates the position of the leading end PM of the printing sheet P in the conveyance operation for the printing sheet P.

Further, in the formula (1), TV1 is an adjustment value indicating an adjustment amount for adjusting a distance between (the leading end PM of) the printing sheet P and the cutting position P1(X) according to an assembly state of the cutting mechanism 100 assembled to the housing 1A. TV2 is a correction value indicating a correction amount for the length of the printing sheet P according to the result of detection by the registration sensor 106.

More specifically, the controller 7 obtains the distance Y with reference to the setting information stored in the EEPROM 74. In addition, the controller 7 obtains the length Z of the printing sheet P in the conveyance direction that is included in a print job, for instance, by referring to the print job. Further, the controller 7 obtains the length Z/2, for instance, by calculating the length Z/2 from the obtained length Z. Moreover, the controller 7 obtains the distance X based on the result of the conveyance position determination process. Moreover, the controller 7 obtains the adjustment value TV1 with reference to the adjustment information stored in the EEPROM 74. Moreover, the controller 7 obtains actual measurement values of the length (i.e., the print medium length) Z measured using the registration sensor 106, thereby determining the length Z, which is an average value of the obtained actual measurement values, and the adjustment value TV2.

In addition, by referring to the setting information stored in the EEPROM 74, the controller 7 obtains a conveyance amount A. The conveyance amount A corresponds to the print width for an individual printing process by the print engine 3 in the conveyance direction. When the controller 7 determines that the conveyance amount A (i.e., the print width) is larger than the conveyance amount B for the printing sheet P, the controller 7 performs a first conveyance process to cause the conveyor to convey the printing sheet P by the conveyance amount B, thereby conveying the printing sheet P to the cutting position P1(X), without performing a printing process by the print engine 3. Thereafter, the controller 7 performs a cutting process to cut the printing sheet P into the first printing sheet P1 and the second printing sheet P2 by the cutting mechanism 100.

Further, the controller 7 performs a second conveyance process to convey the second printing sheet P2 to a printing position, which is a print start position for the printing process by the print engine 3, by causing the conveyor to convey the second printing sheet P2 after the cutting process by a conveyance amount equivalent to a difference value resulting from subtracting the conveyance amount B from the conveyance amount A. In this second conveyance process, the first printing sheet P1 is also conveyed toward the discharge tray 22 by the conveyor.

On the other hand, when the controller 7 determines that the conveyance amount A is equal to or smaller than the conveyance amount B, the controller 7 performs a printing process by the print engine 3 without performing the cutting process. Thus, the controller 7 determines whether to perform the cutting process by the cutting mechanism 100 based on the result of the conveyance position determination process.

Example of Basic Operations by Printing Apparatus

Next, referring to FIGS. 5A and 5B, a specific explanation will be provided of an example of basic operations by the printing apparatus 1 in the first illustrative embodiment. In the following explanation, operations after the controller 7 accepts a print job from the user via the network I/F 107 or the operation reception I/F 109 will be described.

As shown in FIG. 5A, in S1, the controller 7 controls the conveyor to feed a printing sheet P from the feed tray 21 to the conveyance path R.

Next, the controller 7 performs an obtaining process to obtain the print media length Z, which is the length Z of the printing sheet P in the conveyance direction, based on the result of detection by the registration sensor 106 (S2). The operation in S2 is executed when the printing apparatus 1 performs a first printing process. When the printing apparatus 1 performs a plurality of printing processes for a plurality of printing sheets P, the obtaining process is performed in S200, after an after-mentioned step S7.

Specifically, when the printing apparatus 1 performs the first printing process, the controller 7 obtains, in S2, a default value (e.g., 297 mm of A4 size) of the print media length Z of the printing sheet P as a result of the obtaining process, for instance, with reference to the setting information stored in the EEPROM 74.

When the printing process is continuously performed in the printing apparatus 1, in S200, the controller 7 obtains an actual measurement value of the print media length Z from the result of detection by the registration sensor 106 for each printing sheet P, and sequentially records the obtained actual measurement value of the print media length Z, for instance, in the RAM 73.

Further, when the controller 7 obtains a plurality of actual measurement values of the print media lengths Z based on the results of detection by the registration sensor 106 in the obtaining process of S200, the controller 7 calculates an average value of the plurality of actual measurement values of the print media lengths Z, and sets the calculated average value as the print media length Z.

Namely, the controller 7 obtains the actual measurement value of the print media length Z using respective detection times at which the leading end PM and the trailing end PU of the printing sheet P shown in FIG. 4 have been detected by the registration sensor 106 and a conveyance time taken for the conveyor to convey the printing sheet P from the leading end PM to the trailing end PU. Then, the controller 7 stores the obtained actual measurement value in the RAM 73. Then, the controller 7 calculates an average value of the obtained values of the print media length Z. The obtained values of the print media length Z include the default value obtained in the first printing process, and at least one actual measurement value stored in the RAM 73 in the second and subsequent printing processes. The controller 7 uses the calculated average value as the length (i.e., the print media length) Z as a result of the obtaining process.

Further, the controller 7 calculates the correction value TV2 in the formula (1) based on the obtained print media length Z. Specifically, when the obtained print media length Z is 298 mm, the controller 7 compares the obtained print media length Z (298 mm) with, for instance, 297 mm that is the print media length Z specified in the JIS standard, and adopts 1 mm (=298 mm−297 mm) as the correction value TV2.

In addition to the above description, for instance, the controller 7 may be configured to use the default value when the feed tray 21 is opened or closed or in response to a user instruction input via the operation reception I/F 109 as a trigger. Further, as described above, the controller 7 may be configured to obtain the print media length Z, which is the length of the printing sheet P in the conveyance direction, with reference to the print job.

Subsequently, the controller 7 calculates the conveyance amount B for the printing sheet P using the distance Y between the reference position P0 and the cutting position P1(X) for the cutting mechanism 100 to cut the printing sheet P, a distance (Z/2) between the reference position P0 and a planned cutting position PC (see FIG. 4) of the printing sheet P to be cut by the cutting mechanism 100, and the distance X between the reference position P0 and the current position of the leading end PM of the printing sheet P (S3). The planned cutting position PC is an intermediate position between the leading end PM and the trailing end PU of the printing sheet P.

Specifically, the controller 7 substitutes the distance Y, the distance (Z/2), and the distance X into the formula (1). Further, the controller 7 substitutes the adjustment value TV1 obtained from EEPROM 74 and the correction value TV2 calculated in the obtaining process into the formula (1), thereby obtaining the conveyance amount B.

Next, the controller 7 performs a printing process to cause the print engine 3 to perform printing based on print data corresponding to the particular print width (S4). Subsequently, the controller 7 determines whether the printing process for one page specified in the print job has been completed for the printing sheet P (S5). In response to determining that the printing process for one page has been completed (S5: Yes), the controller 7 determines whether the printing sheet P has already been cut into the first printing sheet P1 and the second printing sheet P2 (S6).

In response to determining that the printing sheet P has already been cut into the first printing sheet P1 and the second printing sheet P2 (S6: Yes), the controller 7 controls the conveyor to discharge the first printing sheet P1 and the second printing sheet P2 onto the discharge tray 22 (S7).

On the other hand, in response to determining that the printing sheet P has not been cut into the first printing sheet P1 and the second printing sheet P2 (S6: No), the controller 7 controls the conveyor to convey the printing sheet P until the planned cutting position PC of the printing sheet P coincides with the cutting position P1(X) of the cutting mechanism 100 (S8). Then, the controller 7 causes the cutting mechanism 100 to cut the printing sheet P into the first printing sheet P1 and the second printing sheet P2 (S9). Thereafter, the controller 7 proceeds to S7.

In response to determining that the printing process for one page has not been completed (S5: No), the controller 7 determines whether the printing sheet P has already been cut into the first printing sheet P1 and the second printing sheet P2 (S10). In response to determining that the printing sheet P has already been cut into the first printing sheet P1 and the second printing sheet P2 (S10: Yes), the controller 7 controls the conveyor to convey the second printing sheet P2 to a next printing position (S11). Thereafter, the controller 7 proceeds to S4.

On the other hand, in response to determining that the printing sheet P has not been cut into the first printing sheet P1 and the second printing sheet P2 (S10: No), the controller 7 determines whether the printing sheet P (more exactly, the planned cutting position PC of the printing sheet P) after the next conveyance would go beyond the cutting position P1(X). In other words, the controller 7 compares the conveyance amount A (i.e., the print width) with the conveyance amount B, thereby determining whether the conveyance amount A is larger than the conveyance amount B for the printing sheet P (S12). In response to determining that the conveyance amount A is equal to or smaller than the conveyance amount B (S12: No), the controller 7 proceeds to S11.

On the other hand, in response to determining that the conveyance amount A is larger than the conveyance amount B (S12: Yes), the controller 7 controls the conveyor to perform the first conveyance process (S13). Namely, the controller 7 causes the conveyor to convey the printing sheet P to the cutting position P1(X). The controller 7 then causes the cutting mechanism 100 to cut the printing sheet P into the first printing sheet P1 and the second printing sheet P2 (S14). Thereafter, the controller 7 proceeds to S11. In this case, however, after the cutting process in S14, the controller 7 performs in S11 the second conveyance process to cause the conveyor to convey the second printing sheet P2 by the conveyance amount (A-B).

In S12, the controller 7 uses the conveyance amount A corresponding to the print width to determine an expected conveyance position of the print paper P after the next conveyance. Therefore, it is possible for the controller 7 to appropriately perform the printing process in S11 and the subsequent step S4, and to prevent a reduction in printing performance.

Namely, to determine the conveyance position of the printing sheet P after the next conveyance, the controller 7 uses, as the conveyance amount A, not a conveyance amount that is an integer multiple of a conveyance pitch but a conveyance amount corresponding to a nozzle pitch defined as a separation distance in the conveyance direction between two nozzles 32N that are adjacent to each other in the conveyance direction. As a result, it is possible for the controller 7 to cause the print engine 3 to perform, on the printing sheet P, accurate printing according to print data for the conveyance amount A that matches the particular print width. Thus, it is possible to prevent a reduction in printing performance. It is noted that the conveyance pitch is a minimum conveyance amount for the printing sheet P that is controllable by the controller 7 driving the conveyance motor 102.

Example of Sequence of Operations for Printing Sheet

Next, referring to FIGS. 6A to 6F, a specific explanation will be provided of an example of a sequence of operations for the printing sheet P in the printing apparatus 1 of the first illustrative embodiment.

Figure 6C:
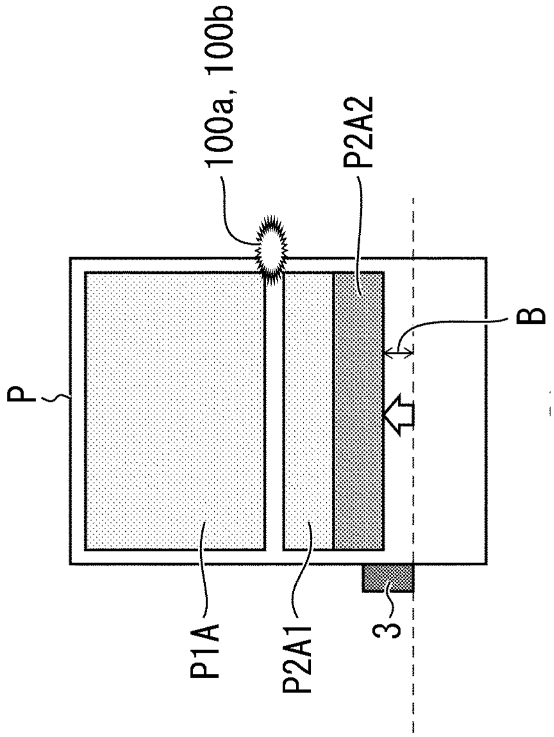
FIGS. 6A to 6F illustrate an example of a sequence of specific operations for the printing sheet by the printing apparatus.
Figure 6B:
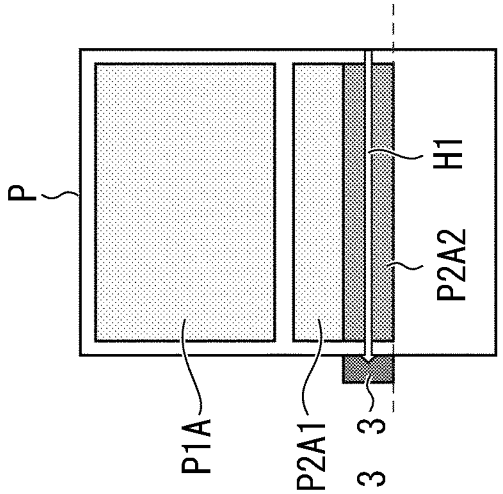
Figure 6A:
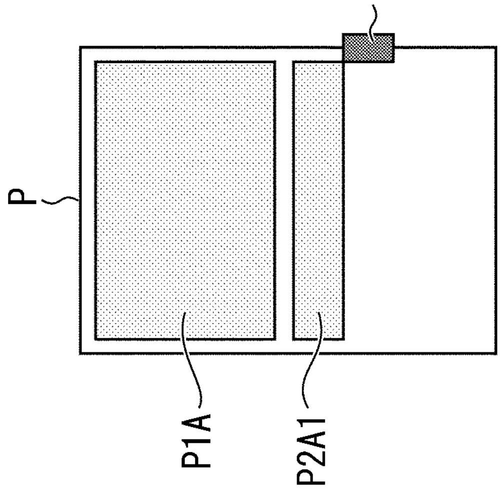

In FIG. 6A, the printing apparatus 1 of the first illustrative embodiment forms printed areas P1A and P2A1 with images printed therein based on print data, on a portion of the printing sheet P that has been discharged upstream in the conveyance direction from the print engine 3. Then, in the printing apparatus 1 of the first illustrative embodiment, as indicated by an arrow H1 in FIG. 6B, the controller 7 causes the print engine 3 to perform a printing process, thereby forming a printed area P2A2 with an image printed therein based on print data, on a portion of the printing sheet P.

Next, when determining in S12 that the conveyance amount A is larger than the conveyance amount B, the controller 7 performs the first conveyance process as shown in FIG. 6C. Namely, the controller 7 causes the conveyor to convey the printing sheet P by the conveyance amount B in such a manner that the planned cutting position PC reaches the cutting position P1(X).

Figures 6D, 6E, 6F:
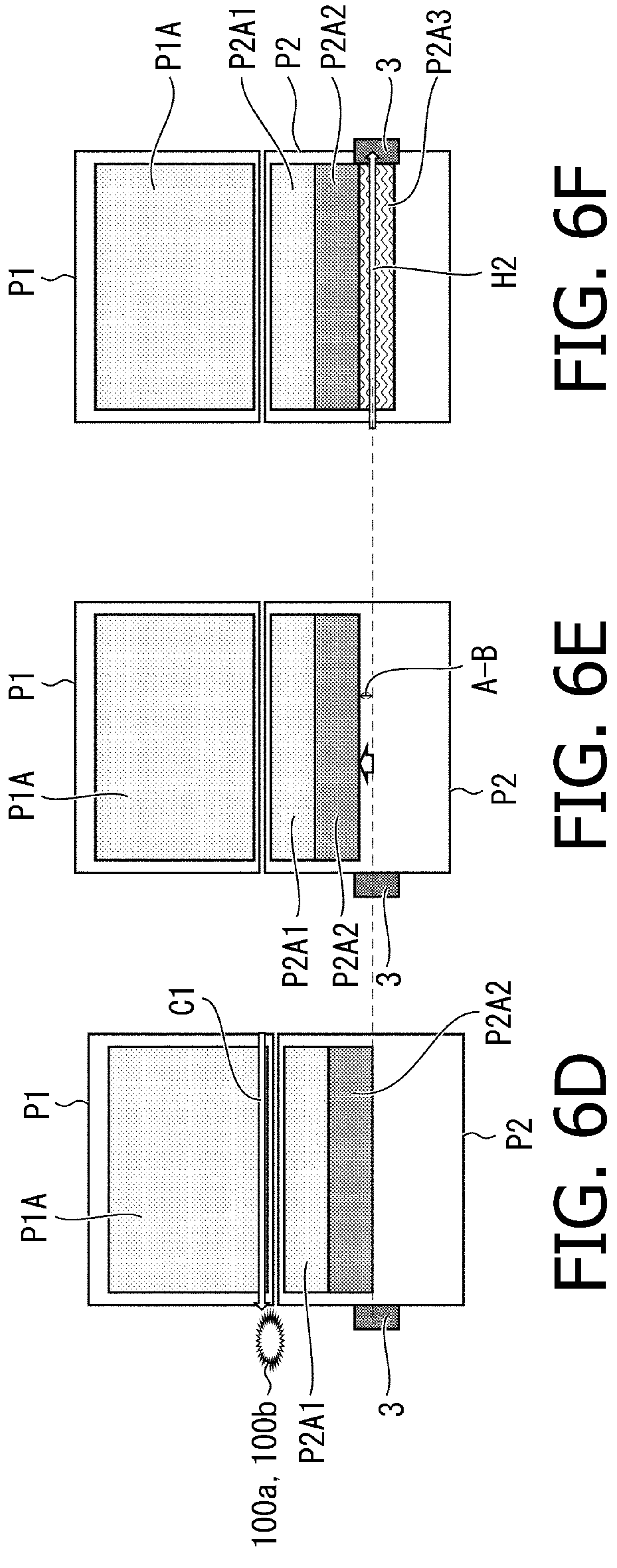

Next, as indicated by an arrow C1 in FIG. 6D, the controller 7 causes the cutting mechanism 100 to perform a cutting process, thereby dividing the printing sheet P into the first printing sheet P1 and the second printing sheet P2. Thereafter, the controller 7 performs the second conveyance process as shown in FIG. 6E. Namely, the controller 7 causes the conveyor to perform a conveyance process of conveying the second printing sheet P2 by the conveyance amount (A-B), thereby setting a position of the second printing sheet P2 to be coincident with a printing position for a next printing operation.

Finally, as indicated by an arrow H2 in FIG. 6F, the controller 7 causes the print engine 3 to perform a printing process, thereby forming a printed area P2A3 with an image printed therein based on print data, on a portion of the second printing sheet P2.

As described above, the printing apparatus 1 of the first illustrative embodiment has the print engine 3, the cutting mechanism 100, and the controller 7. The controller 7 compares the conveyance amount A, which corresponds to the print width for an individual printing process by the print engine 3, with the conveyance amount B for the printing sheet P that is calculated using the distance between the reference position P0 and the cutting position P1(X) and the distance between the reference position P0 and the planned cutting position PC. When determining that the conveyance amount A is larger than the conveyance amount B for the printing sheet P, the controller 7 performs the first conveyance process to cause the conveyor to convey the printing sheet P by the conveyance amount B, thereby conveying the printing sheet P to the cutting position P1(X). Subsequently, the controller 7 performs the cutting process to cause the cutting mechanism 100 to cut the printing sheet P into the first printing sheet P1 and the second printing sheet P2. Further, the controller 7 performs the second conveyance process to cause the conveyor to convey the second printing sheet P2 by the conveyance amount (A-B), thereby conveying the second printing sheet P2 to the printing position, which is the print start position for the printing process by the print engine 3.

In the printing apparatus 1 configured as above in the first illustrative embodiment, when determining that the conveyance amount A (i.e., the print width) is larger than the conveyance amount B for the printing sheet P, the controller 7 performs the first conveyance process, thereby conveying the printing sheet P to the cutting position in preference to performing the conveyance process to convey the printing sheet P to the printing position and the printing process in the printing position. Further, the controller 7 sequentially performs the cutting process and the second conveyance process, thereby conveying the second printing sheet P2 after the cutting process to the printing position. As a result, in the printing apparatus 1 of the first illustrative embodiment, it is possible to improve throughput while suppressing a reduction in printing performance even when the cutting process is performed.

In the printing apparatus 1 of the first illustrative embodiment, the controller 7 calculates the conveyance amount B for the printing sheet P using the distance between the reference position P0 and the leading end PM of the printing sheet P. Thereby, in the printing apparatus 1 of the first illustrative embodiment, the controller 7 is enabled to calculate the conveyance amount B in consideration of the current conveyance position of the leading end PM of the printing sheet P on the conveyance path R. As a result, in the printing apparatus 1 of the first illustrative embodiment, it is possible to calculate the conveyance amount B with high accuracy and to accurately cut the printing sheet P.

In the printing apparatus 1 of the first illustrative embodiment, the controller 7 performs the obtaining process to obtain the print media length, which is the length of the printing sheet P in the conveyance direction, based on the result of detection by the registration sensor 106. Thereby, in the printing apparatus 1 of the first illustrative embodiment, the controller 7 is enabled to obtain an accurate print media length even when there are variations in the print media length. As a result, the printing apparatus 1 of the first illustrative embodiment is enabled to calculate the conveyance amount B with high accuracy and to accurately cut the printing sheet P.

In the printing apparatus 1 of the first illustrative embodiment, when having obtained a plurality of print media lengths based on the results of detection by the registration sensor 106 in the obtaining process, the controller 7 calculates an average value of the plurality of print media lengths and uses the calculated average value as (a representative value of) the print media length. Thereby, in the printing apparatus 1 of the first illustrative embodiment, the controller 7 is enabled to obtain an accurate print media length even when there are variations in the print media length. As a result, the printing apparatus 1 of the first illustrative embodiment is enabled to calculate the conveyance amount B with high accuracy and to accurately cut the printing sheet P.

In the printing apparatus 1 of the first illustrative embodiment, the controller 7 calculates the conveyance amount B using the adjustment value TV1 stored in the EEPROM 74. Thereby, in the printing apparatus 1 of the first illustrative embodiment, even when the cutting position P1(X) of the cutting mechanism 100 varies according to the assembly state of the cutting mechanism 100 assembled to the housing 1A, the controller 7 is enabled to obtain the conveyance amount B with high accuracy. As a result, the printing apparatus 1 of the first illustrative embodiment is enabled to easily calculate the conveyance amount B with high accuracy and to easily cut the printing sheet P with high accuracy.

As described above, the printing apparatus 1 of the first illustrative embodiment is enabled to calculate with high accuracy the conveyance amount B, which changes dynamically according to factors such as a conveyance state of the printing sheet P. As a result, in the printing apparatus 1 of the first illustrative embodiment, the controller 7 is enabled to accurately determine the cutting position for each printing sheet P and easily cut each printing sheet P into the first printing sheet P1 and the second printing sheet P2 with high accuracy. Further, the printing apparatus 1 of the first illustrative embodiment is enabled to perform a printing process on each of the first printing sheet P1 and the second printing sheet P2 with high accuracy and to suppress a reduction in printing performance on each of the first printing sheet P1 and the second printing sheet P2.

First Modification

A first modification according to aspects of the first illustrative embodiment in the present disclosure will be described below. For the sake of explanatory convenience, elements having substantially the same functions as those described in the first illustrative embodiment will be represented with the same reference characters, and detailed explanations thereof may be omitted.

Figure 7:
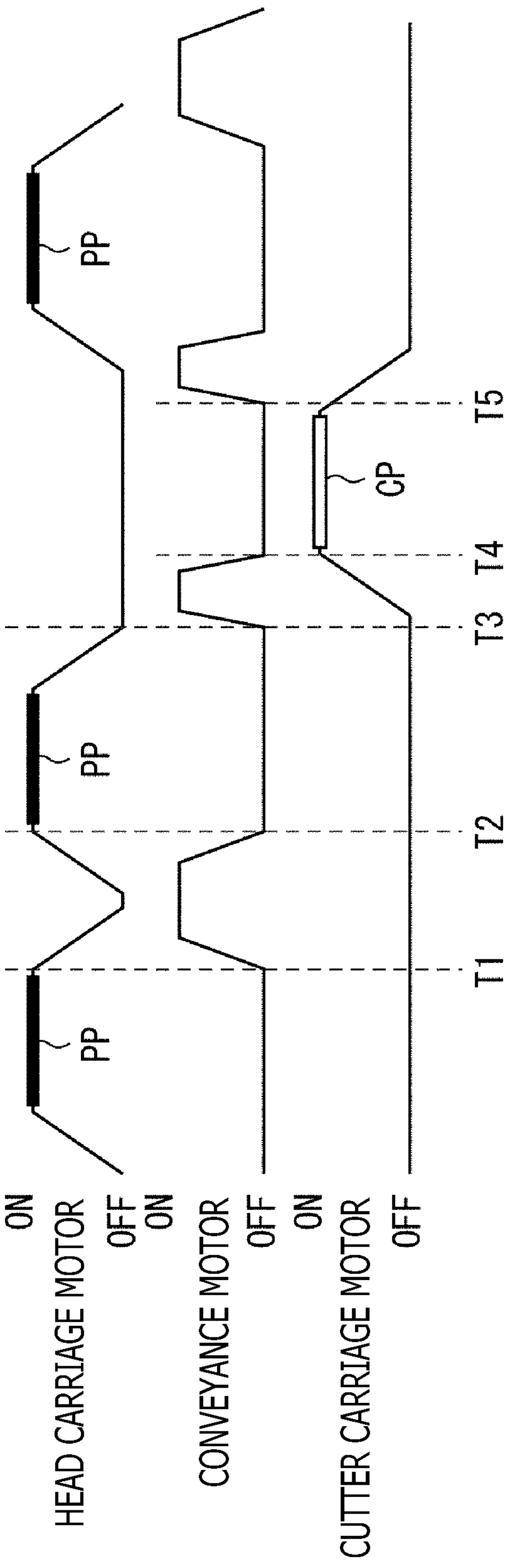
FIG. 7 is a timing chart for illustrating an example of operations by the printing apparatus.

FIG. 7 is a timing chart for illustrating an example of operations in the first modification. In FIG. 7, a major difference between the first modification and the first illustrative embodiment is that in the first modification, the controller 7 performs the conveyance process by the conveyor and the cutting process by the cutting mechanism 100 at timings overlapping each other.

As shown in FIG. 7, in the first modification, a printing process PP by the print engine 3 is performed during each ON time for which the head carriage motor 103 is turned on. The conveyance motor 102 starts rotating at a time T1 and stops rotating at a time T2. Namely, the printing sheet P is conveyed along the conveyance path R by the conveyor during a period between the time T1 and the time T2.

Further, by driving the cutter carriage motor 104, the controller 7 performs a conveyance process to cause the conveyor to convey the printing sheet P during an acceleration period during which the blades 100*a* and 100*b* are accelerated from a stopped state to a particular moving speed. In other words, as shown in FIG. 7, the acceleration period, required until the moving speed of the blades 100*a* and 100*b* reaches the particular moving speed, is set for the cutter carriage motor 104 between a time T3 and a time T4 during which the conveyance motor 102 is driven to rotate. During the acceleration period, the blades 100*a* and 100*b* are not in contact with the printing sheet P, and a cutting process CP is substantially not performed. In the first modification, the controller 7 starts the cutting process CP shortly after the time T4.

Further, by controlling the cutter carriage motor 104, the controller 7 performs a conveyance process to cause the conveyor to convey the printing sheet P during a deceleration period during which the blades 100*a* and 100*b* are decelerated from the particular moving speed to the stopped state. In other words, as shown in FIG. 7, the deceleration period, required until the blades 100*a* and 100*b* are decelerated from the particular moving speed to the stopped state, is set for the cutter carriage motor 104 during a period after a time T5 (inclusive). During the deceleration period, the blades 100*a* and 100*b* are not in contact with the printing sheet P, and the cutting process CP is substantially not performed. In the first modification, the controller 7 terminates the cutting process CP shortly before the time T5.

As described above, in the first modification, the controller 7 may perform the conveyance process to cause the conveyor to convey the printing sheet P during the acceleration period. Thereby, in the first modification, the printing apparatus 1 may be configured to further improve the throughput while suppressing a reduction in the printing performance, even when performing the cutting process.

In the first modification, the controller 7 may perform the conveyance process to cause the conveyor to convey the printing sheet P during the deceleration period. Thereby, in the first modification, the printing apparatus 1 may be configured to improve the throughput while suppressing a reduction in the printing performance, even when performing the cutting process.

In another instance, the printing apparatus 1 may be configured to substantially perform the cutting process CP by bringing the blades 100*a* and 100*b* into contact with the printing sheet P during at least one of the acceleration period and the deceleration period. In this case, it is possible to easily downsize the printing apparatus 1 by compactly arranging the conveyor and the cutting mechanism 100 along the conveyance path R.

Second Illustrative Embodiment

A second illustrative embodiment according to aspects of the present disclosure will be described below. For the sake of explanatory convenience, elements having substantially the same functions as those described in the first illustrative embodiment will be represented with the same reference characters, and detailed explanations thereof may be omitted.

Figure 8A:
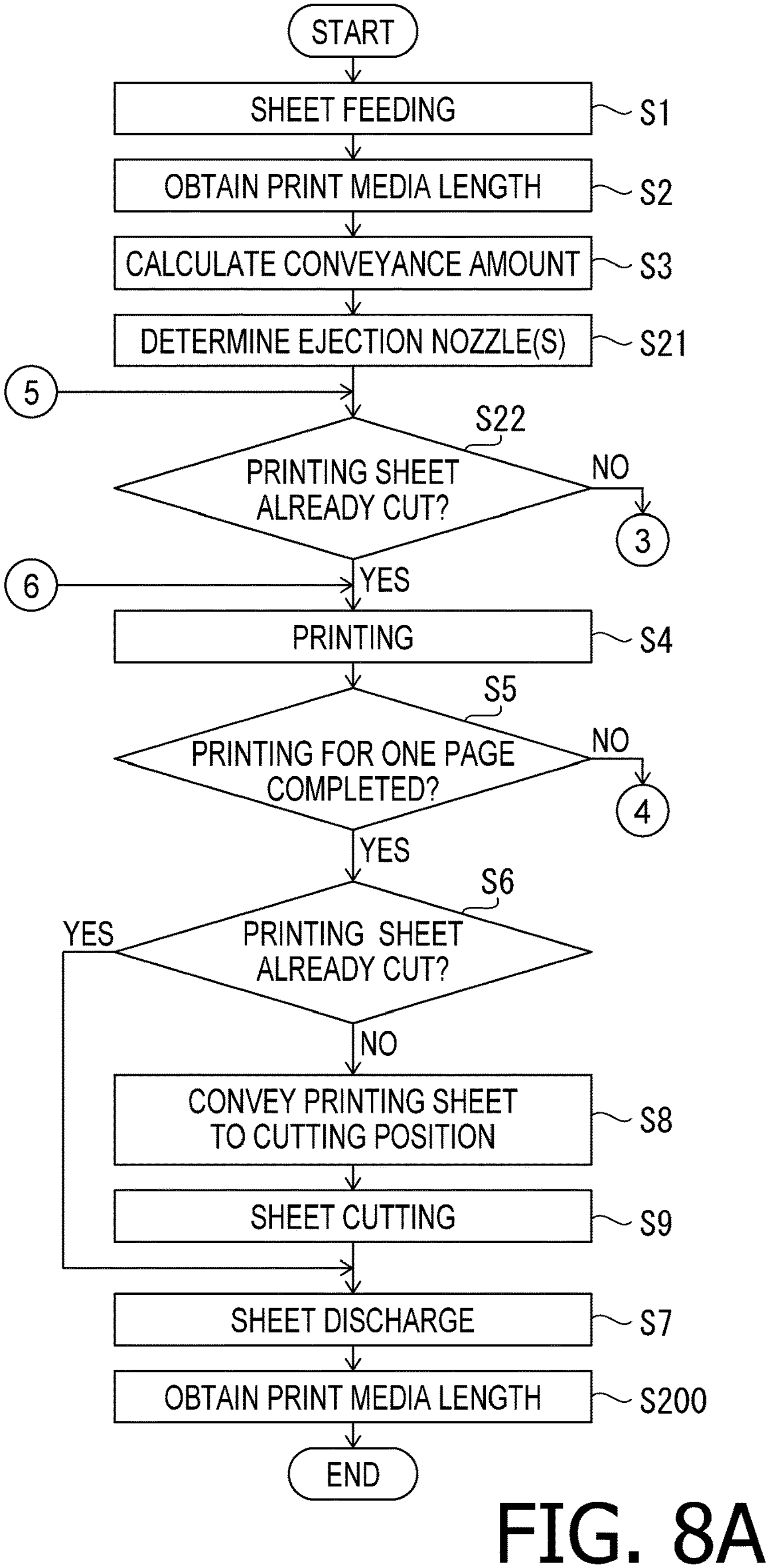
FIGS. 8A and 8B are flowcharts showing an example procedure of basic operations by the printing apparatus.
Figure 8B:
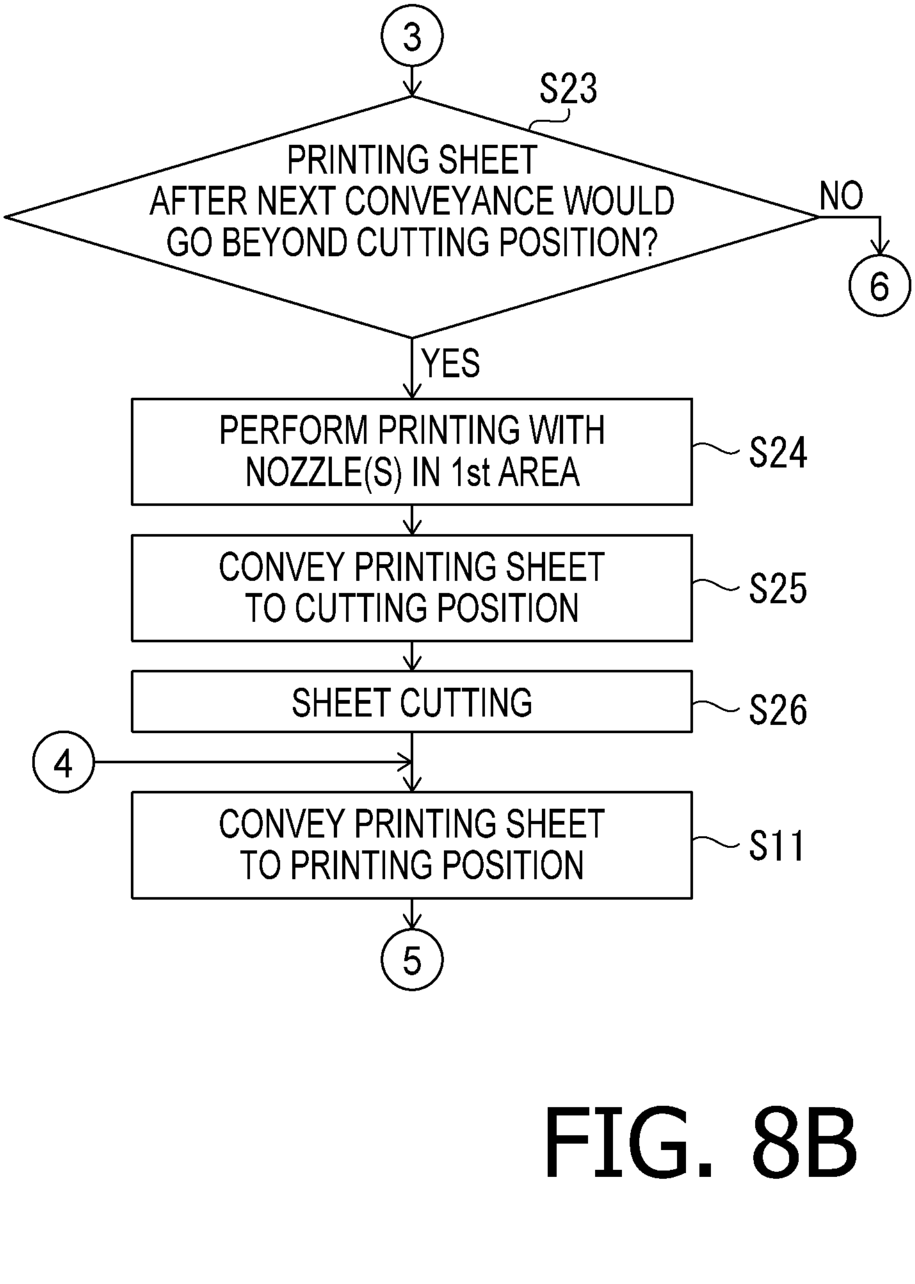

FIGS. 8A and 8B are flowcharts showing an example procedure of basic operations by the printing apparatus 1 in the second illustrative embodiment. FIGS. 9A to 9E illustrate an example of a sequence of specific operations (see FIGS. 8A and 8B) to be performed for the printing sheet P by the printing apparatus 1.

In the relevant drawings including FIGS. 8 and 9A to 9E, a difference between the second illustrative embodiment and the first illustrative embodiment is that in the second illustrative embodiment, a determination process to determine ejection nozzle(s) to be actually used is performed in the printing process by the print engine 3.

As shown in FIG. 8A, after calculating the conveyance amount B (S3), the controller 7 performs a determination process in S21. Specifically, in the determination process of S21, based on print data contained in the print job, the controller 7 determines at least one nozzle 32N that is included in the first area H1A (see FIG. 3) provided upstream of the second area H2A (see FIG. 3) in the conveyance direction among the plurality of nozzles 32N, as ejection nozzle(s) to eject ink droplets onto the printing sheet P. Namely, the controller 7 determines, as the ejection nozzle(s), at least one of the plurality of nozzles 32N included in the first area H1A based on the print data. Thereby, in the printing apparatus 1 of the second illustrative embodiment, the print width and the conveyance amount A corresponding to the print width vary depending on the determined ejection nozzle(s).

Next, the controller 7 determines whether the printing sheet P has already been cut into the first printing sheet P1 and the second printing sheet P2 (S22). In response to determining that the printing sheet P has already been cut into the first printing sheet P1 and the second printing sheet P2 (S22: Yes), the controller 7 proceeds to S4.

On the other hand, in response to determining that the printing sheet P has not been cut into the first printing sheet P1 and the second printing sheet P2 (S22: No), the controller 7 determines whether the printing sheet P (more exactly, the planned cutting position PC of the printing sheet P) after the next conveyance would go beyond the cutting position P1(X). In other words, the controller 7 compares the conveyance amount A (i.e., the print width), which has changed depending on the number of the determined ejection nozzle (s), with the conveyance amount B, thereby determining whether the conveyance amount A is larger than the conveyance amount B for the printing sheet P (S23). In response to determining that the conveyance amount A is equal to or smaller than the conveyance amount B (S23: No), the controller 7 proceeds to S4.

On the other hand, in response to determining that the conveyance amount A is larger than the conveyance amount B (S23: Yes), the controller 7 performs a printing process with the at least one nozzle 32N included in the first area H1A that has been determined as the ejection nozzle(s) (S24).

Next, the controller 7 controls the conveyor to perform the first conveyance process (S25). Namely, the controller 7 causes the conveyor to convey the printing sheet P to the cutting position P1(X). Thereafter, the controller 7 causes the cutting mechanism 100 to cut the printing sheet P into the first printing sheet P1 and the second printing sheet P2 (S26). Then, the controller 7 proceeds to S22.

Figure 9C:
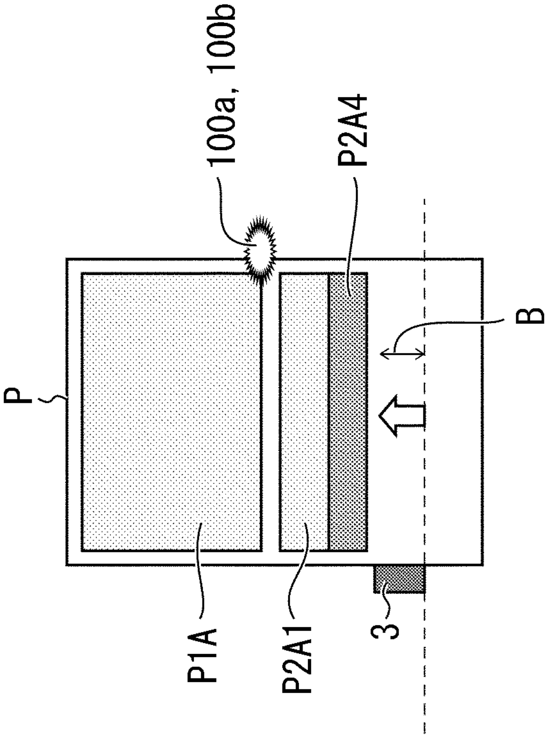
FIGS. 9A to 9E illustrate an example of a sequence of specific operations for the printing sheet by the printing apparatus.
Figure 9B:
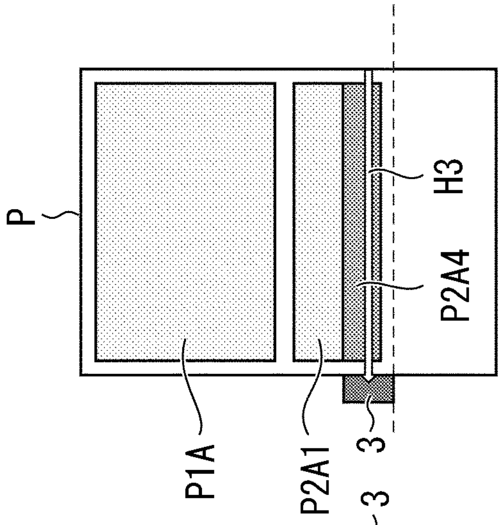
Figure 9A:
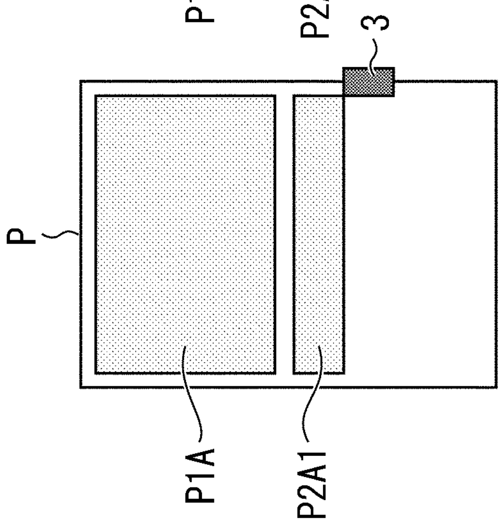
Figure 9E:
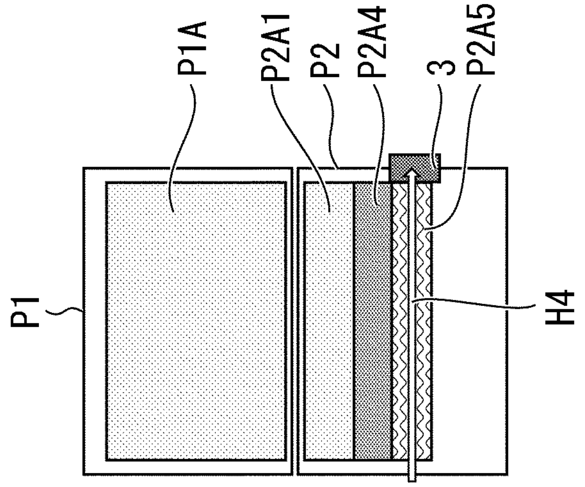

In FIG. 9A, the printing apparatus 1 of the second illustrative embodiment forms printed areas P1A and P2A1 with images printed therein based on print data, on a portion of the printing sheet P that has been discharged upstream in the conveyance direction from the print engine 3. Afterward, in the printing apparatus 1 of the second illustrative embodiment, as indicated by an arrow H3 in FIG. 9B, the controller 7 causes the print engine 3 to perform a printing process, thereby forming a printed area P2A4 with an image printed therein based on print data, on a portion of the printing sheet P. This printing process is performed using the at least one nozzle 32N included in the first area H1A that has been determined as the ejection nozzle(s) in S21.

Next, in response to determining in S23 (see FIG. 8B) that the conveyance amount A, which has changed depending on the number of the determined ejection nozzle(s), is larger than the conveyance amount B, the controller 7 performs the first conveyance process, as shown in FIG. 9C. Namely, the controller 7 causes the conveyor to convey the printing sheet P by the conveyance amount B in such a manner that the planned cutting position PC reaches the cutting position P1(X).

Figure 9D:
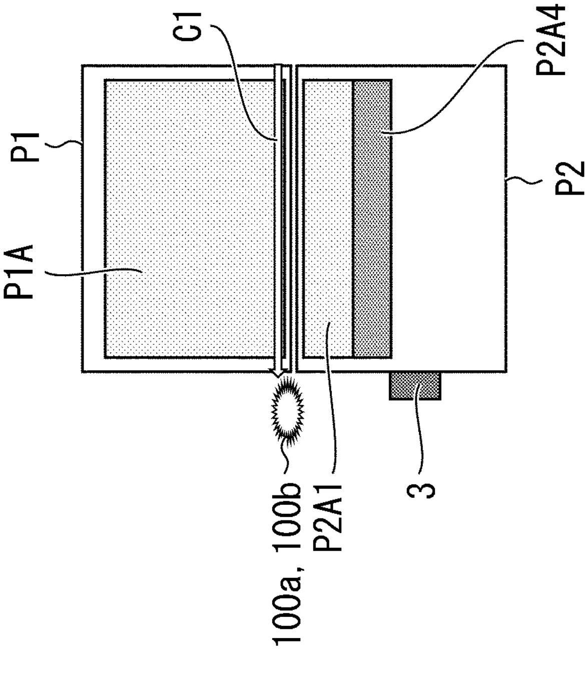

Next, as indicated by an arrow C1 in FIG. 9D, the controller 7 causes the cutting mechanism 100 to perform a cutting process, thereby dividing the printing sheet P into the first printing sheet P1 and the second printing sheet P2. Thereafter, as indicated by an arrow H4 in FIG. 9E, the controller 7 causes the print engine 3 to perform a printing process, thereby forming a printed area P2A5 with an image printed therein based on print data, on a portion of the second printing sheet P2. This printing process is performed using all the nozzles 32N included in the print engine 3 as the ejection nozzles.

The printing apparatus 1 configured as above in the second illustrative embodiment produces substantially the same effects as in the aforementioned first illustrative embodiment. In addition, the printing apparatus 1 of the second illustrative embodiment performs the determination process to determine, as the ejection nozzle(s), at least one nozzle 32N included in the first area H1A among the plurality of nozzles 32N, based on the print data contained in the print job. Thereby, the printing apparatus 1 of the second illustrative embodiment is enabled to further improve the throughput while suppressing a reduction in the printing performance, even when performing the cutting process.

In the printing apparatus 1 of the second illustrative embodiment, the controller 7 appropriately determines the ejection nozzle(s) in the first area H1A based on dynamically changing print data. Therefore, as shown in FIGS. 9A to 9E, unlike the first illustrative embodiment, there is no need to perform the second conveyance process. As a result, in the printing apparatus 1 of the second illustrative embodiment, it is possible to make smaller the number of conveyance processes and allow the controller 7 to perform a sequence of operations faster, than in the aforementioned first illustrative embodiment.

In addition, the printing apparatus 1 of the second illustrative embodiment changes the conveyance amount A (i.e., the print width) according to dynamically changing print data. Therefore, the printing apparatus 1 of the second illustrative embodiment is enabled to more appropriately perform the printing process and the cutting process according to the print job than in the aforementioned first illustrative embodiment.

In the above explanation, the case has been described in which the printed area P2A4 is formed on the second printing sheet P2 using the at least one nozzle 32N in the first area H1A that has been determined as the ejection nozzle(s), as shown in FIG. 9B. However, aspects of the second illustrative embodiment are not limited to this. For instance, the controller 7 may be configured to execute S23 and S24 after S21, thereby forming the printed area P2A4 on the first printing sheet P1 using the at least one nozzle 32N in the first area H1A that has been determined as the ejection nozzle(s).

Second Modification

A second modification according to aspects of the second illustrative embodiment in the present disclosure will be described below. For the sake of explanatory convenience, elements having substantially the same functions as those described in the second illustrative embodiment will be represented with the same reference characters, and detailed explanations thereof may be omitted.

Figure 10:
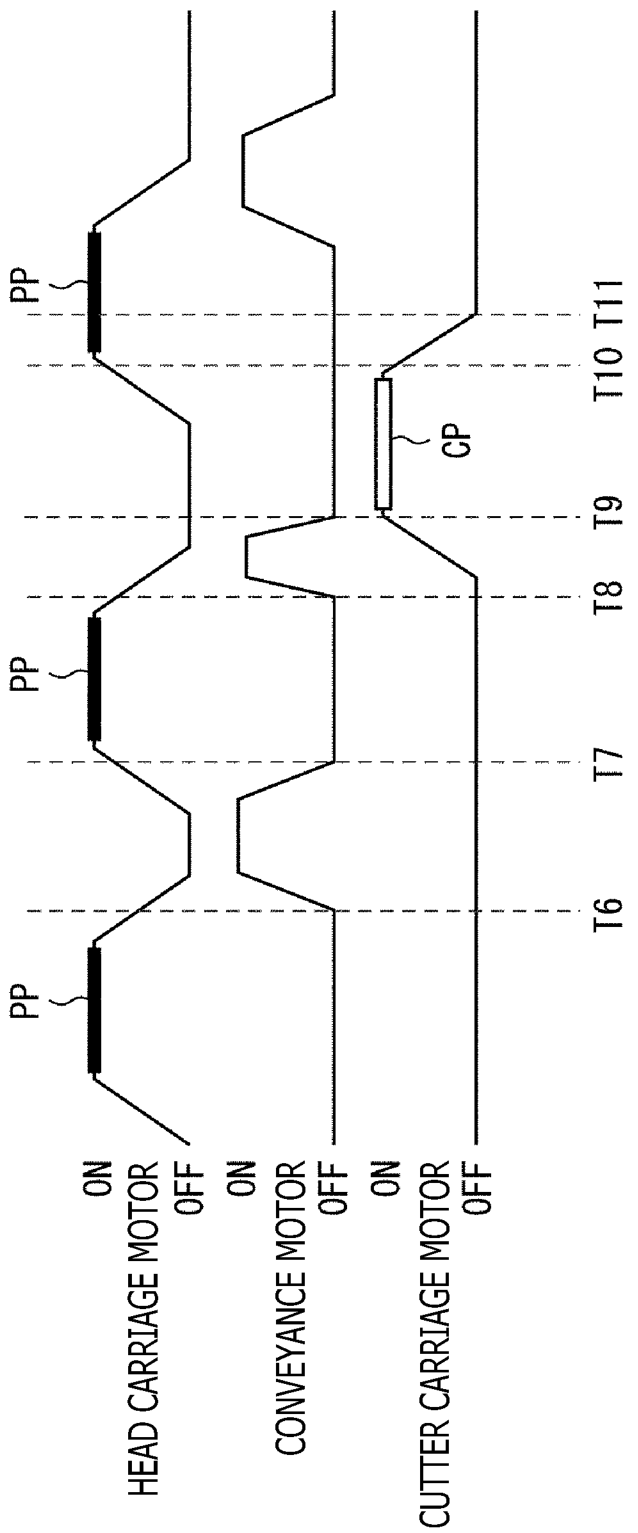
FIG. 10 is a timing chart for illustrating an example of operations by the printing apparatus.

FIG. 10 is a timing chart for illustrating an example of operations in the second modification. In FIG. 10, a major difference between the second modification and the second illustrative embodiment is that in the second modification, the controller 7 performs the conveyance process by the conveyor and the cutting process by the cutting mechanism 100 at timings overlapping each other.

As shown in FIG. 10, in the second modification, the printing process PP by the print engine 3 is performed during each ON time for which the head carriage motor 103 is turned on. The conveyance motor 102 starts rotating at a time T6 and stops rotating at a time T7. Namely, the printing sheet P is conveyed along the conveyance path R by the conveyor during a period between the time T6 and the time T7.

Further, by driving the cutter carriage motor 104, the controller 7 performs a conveyance process to cause the conveyor to convey the printing sheet P during an acceleration period during which the blades 100*a* and 100*b* are accelerated from a stopped state to a particular moving speed. In other words, as shown in FIG. 10, the acceleration period, required until the moving speed of the blades 100*a* and 100*b* reaches the particular moving speed, is set for the cutter carriage motor 104 between a time T8 and a time T9 during which the conveyance motor 102 is driven to rotate. During the acceleration period, the blades 100*a* and 100*b* are not in contact with the printing sheet P, and the cutting process CP is substantially not performed. In the second modification, the controller 7 starts the cutting process CP shortly after the time T9.

Further, by controlling the cutter carriage motor 104, the controller 7 performs a conveyance process to cause the conveyor to convey the printing sheet P during a deceleration period during which the blades 100*a* and 100*b* are decelerated from the particular moving speed to the stopped state. In other words, as shown in FIG. 10, the controller 7 drives the head carriage motor 103 to rotate during the execution of the cutting process CP, and causes the print engine 3 to start the printing process PP shortly after a time T10. Then, the controller 7 continues to perform the printing process PP even after stopping the cutter carriage motor 104 at a time T11.

As described above, in the second modification, the controller 7 may perform the conveyance process to cause the conveyor to convey the printing sheet P during the acceleration period. As a result, in the second modification, the printing apparatus 1 may be configured to further improve the throughput while suppressing a reduction in the printing performance, even when performing the cutting process.

Third Modification

A third modification according to aspects of the second illustrative embodiment in the present disclosure will be described below. For the sake of explanatory convenience, elements having substantially the same functions as those described in the second illustrative embodiment will be represented with the same reference characters, and detailed explanations thereof may be omitted.

Figure 11:
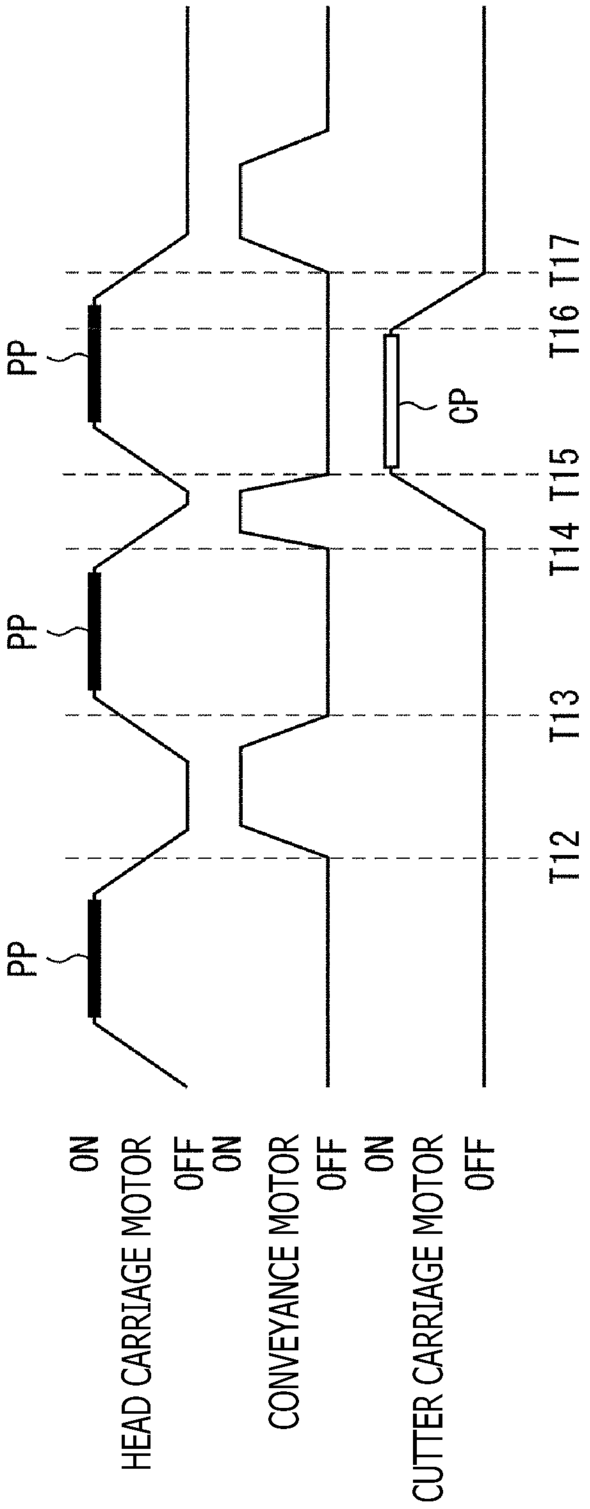
FIG. 11 is a timing chart for illustrating an example of operations by the printing apparatus.

FIG. 11 is a timing chart for illustrating an example of operations in the third modification. In FIG. 11, a major difference between the third modification and the second illustrative embodiment is that in the third modification, the controller 7 performs the printing process by the print engine 3 and the cutting process by the cutting mechanism 100 at timings overlapping each other.

As shown in FIG. 11, in the third modification, the printing process PP by the print engine 3 is performed during each ON time for which the head carriage motor 103 is turned on. The conveyance motor 102 starts rotating at a time T12 and stops rotating at a time T13. Namely, the printing sheet P is conveyed along the conveyance path R by the conveyor during a period between the time T12 and the time T13.

Further, by driving the cutter carriage motor 104, the controller 7 performs a conveyance process to cause the conveyor to convey the printing sheet P during an acceleration period during which the blades 100*a* and 100*b* are accelerated from a stopped state to a particular moving speed. In other words, as shown in FIG. 11, the acceleration period, required until the moving speed of the blades 100*a* and 100*b* reaches the particular moving speed, is set for the cutter carriage motor 104 between a time T14 and a time T15 during which the conveyance motor 102 is driven to rotate. During the acceleration period, the blades 100*a* and 100*b* are not in contact with the printing sheet P, and the cutting process CP is substantially not performed. In the third modification, the controller 7 starts the cutting process CP shortly after the time T15.

Further, by driving the head carriage motor 103, the controller 7 causes the print engine 3 to perform the printing process PP during the execution of the cutting process CP by the cutting mechanism 100. Namely, as shown in FIG. 11, the controller 7 performs the cutting process CP and the printing process PP simultaneously. In addition, the controller 7 terminates the printing process PP during a deceleration period during which the blades 100*a* and 100*b* are decelerated from the particular moving speed to the stopped state. During the deceleration period, the blades 100*a* and 100*b* are not in contact with the printing sheet P, and the cutting process CP is substantially not performed.

As described above, in the third modification, the controller 7 may cause the print engine 3 to perform the printing process PP during a period of time overlapping a cutting period during which the cutting process CP is in execution. Thereby, in the third modification, the printing apparatus 1 may be configured to more certainly achieve further improved the throughput while suppressing a reduction in the printing performance, even when performing the cutting process CP.

It is noted that the second modification and the third modification may be applied to a third illustrative embodiment described below.

Third Illustrative Embodiment

A third illustrative embodiment according to aspects of the present disclosure will be described below. For the sake of explanatory convenience, elements having substantially the same functions as those described in the second illustrative embodiment will be represented with the same reference characters, and detailed explanations thereof may be omitted.

Figure 12A:
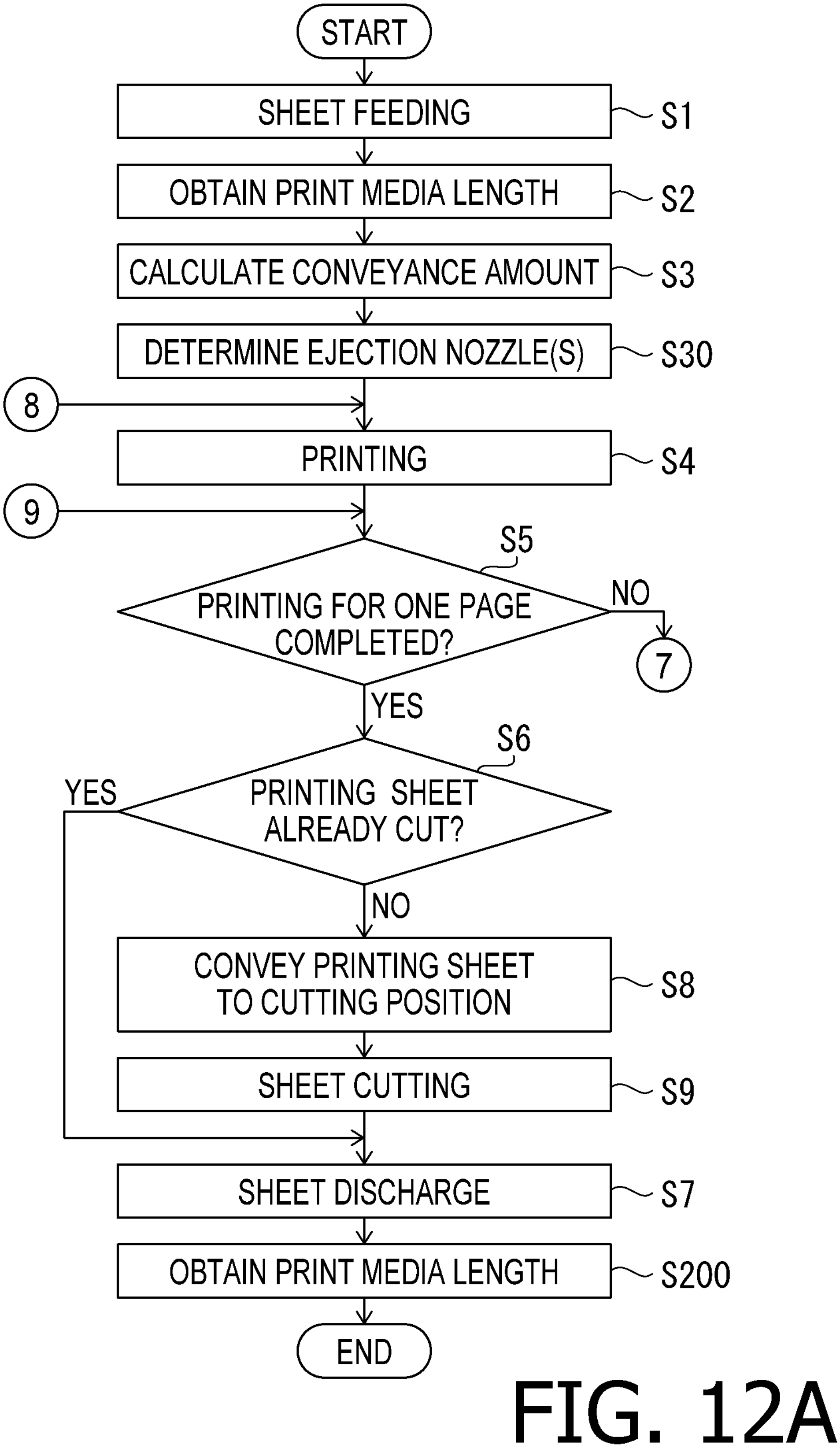
FIGS. 12A and 12B are flowcharts showing an example procedure of basic operations by the printing apparatus.
Figure 12B:
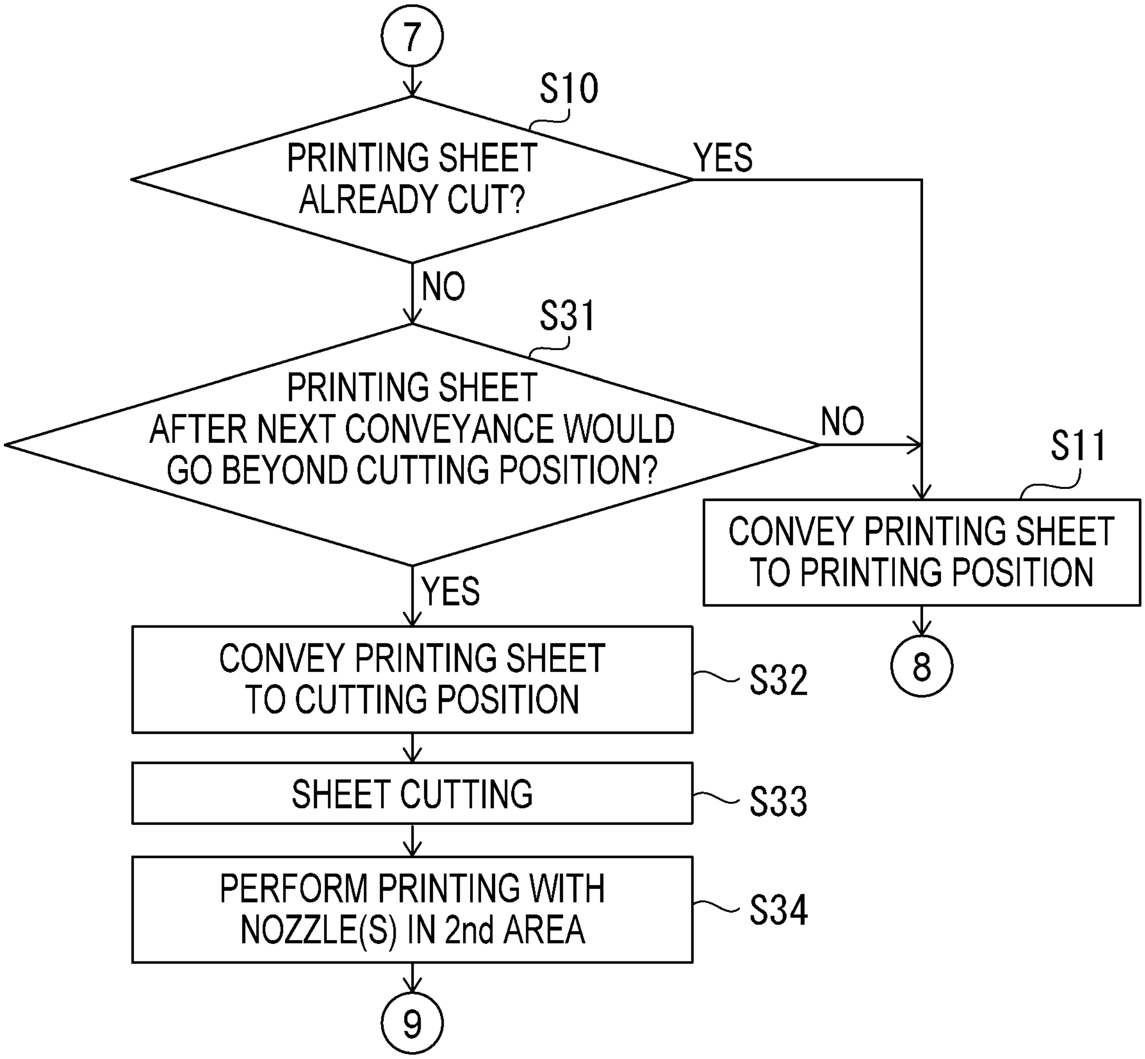

FIGS. 12A and 12B are flowcharts showing an example procedure of basic operations by the printing apparatus 1 in the third illustrative embodiment. FIGS. 13A to 13E illustrate an example of a sequence of specific operations (see FIGS. 12A and 12B) to be performed for the printing sheet P by the printing apparatus 1.

In the relevant drawings including FIGS. 12 and 13A to 13E, a difference between the third illustrative embodiment and the second illustrative embodiment is that in the third illustrative embodiment, the controller 7 determines, as the ejection nozzle(s), at least one nozzle 32N included in the second area H2A in the determination process.

As shown in FIG. 12A, after calculating the conveyance amount B (S3), the controller 7 performs a determination process in S30. Specifically, in the determination process of S30, based on print data contained in the print job, the controller 7 determines at least one nozzle 32N that is included in the second area H2A (see FIG. 3) provided downstream of the first area H1A (see FIG. 3) in the conveyance direction among the plurality of nozzles 32N, as the ejection nozzle(s) to eject ink droplets onto the printing sheet P. Namely, the controller 7 determines, as the ejection nozzle(s), at least one of the plurality of nozzles 32N included in the second area H2A based on the print data. Thereby, in the printing apparatus 1 of the third illustrative embodiment, the print width and the conveyance amount A corresponding to the print width vary depending on the determined ejection nozzle(s).

Further, in response to determining that the printing sheet P has not been cut into the first printing sheet P1 and the second printing sheet P2 (S10: No), the controller 7 determines whether the printing sheet P (more exactly, the planned cutting position PC of the printing sheet P) after the next conveyance would go beyond the cutting position P1(X). In other words, the controller 7 compares the conveyance amount A (i.e., the print width), which has changed depending on the number of the determined ejection nozzle (s), with the conveyance amount B, thereby determining whether the conveyance amount A is larger than the conveyance amount B for the printing sheet P (S31). In response to determining that the conveyance amount A is equal to or smaller than the conveyance amount B (S31: No), the controller 7 proceeds to S11.

On the other hand, in response to determining that the conveyance amount A is larger than the conveyance amount B (S31: Yes), the controller 7 controls the conveyor to perform the first conveyance process (S32). Namely, the controller 7 causes the conveyor to convey the printing sheet P to the cutting position P1(X). Thereafter, the controller 7 causes the cutting mechanism 100 to cut the printing sheet P into the first printing sheet P1 and the second printing sheet P2 (S33).

Next, the controller 7 performs a printing process with nozzle(s) 32N in the second area H2A (S34). Namely, the controller 7 performs the printing process with the determined ejection nozzle(s). Then, the controller 7 proceeds to step S5.

Figure 13C:
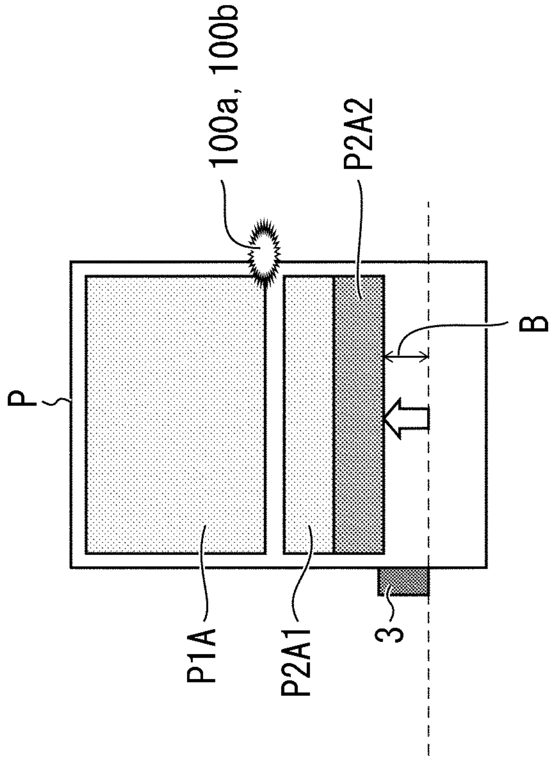
FIGS. 13A to 13E illustrate an example of a sequence of specific operations for the printing sheet by the printing apparatus.
Figure 13B:
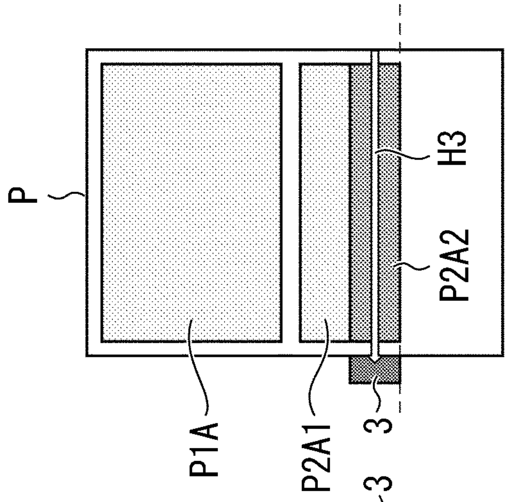
Figure 13A:
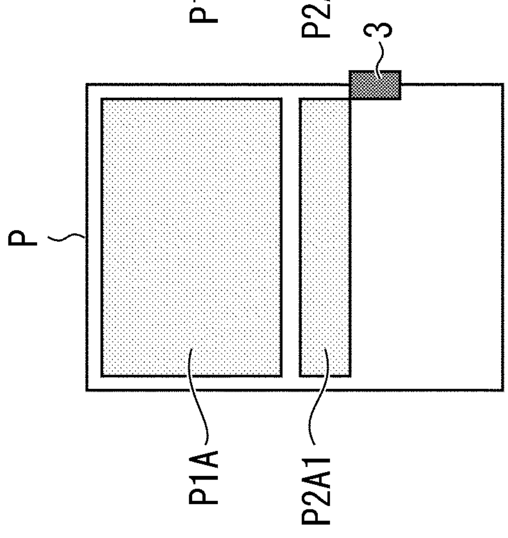
Figure 13E:
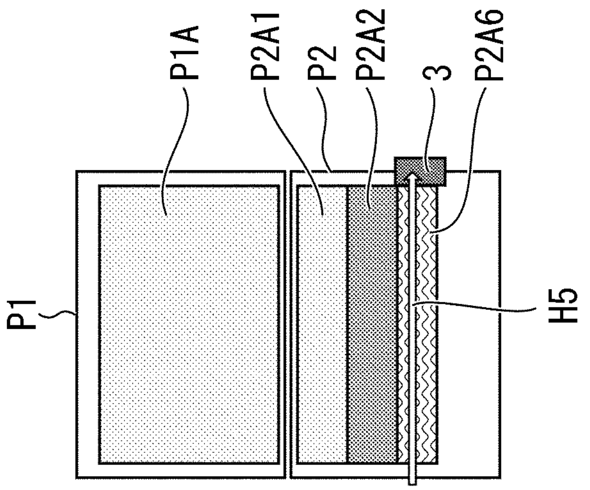

In FIG. 13A, the printing apparatus 1 of the third illustrative embodiment forms printed areas P1A and P2A1 with images printed therein based on print data, on a portion of the printing sheet P that has been discharged upstream in the conveyance direction from the print engine 3. Thereafter, in the printing apparatus 1 of the third illustrative embodiment 3, as indicated by an arrow H1 in FIG. 13B, the controller 7 causes the print engine 3 to perform a printing process, thereby forming a printed area P2A2 with an image printed therein based on print data, on a portion of the printing sheet P.

Next, in response to determining in S31 that the conveyance amount A, which has changed depending on the number of the determined ejection nozzle(s), is larger than the conveyance amount B, the controller 7 performs the first conveyance process, as shown in FIG. 13C. Namely, the controller 7 causes the conveyor to convey the printing sheet P by the conveyance amount B in such a manner that the planned cutting position PC reaches the cutting position P1(X).

Figure 13D:
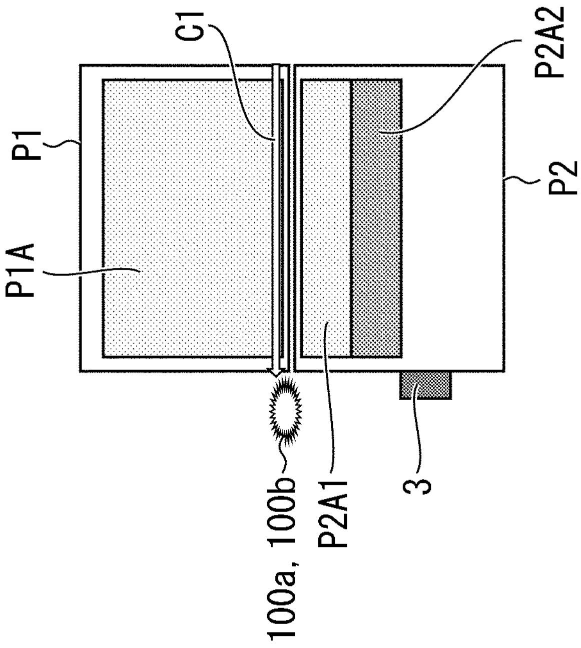

Next, as indicated by an arrow C1 in FIG. 13D, the controller 7 causes the cutting mechanism 100 to perform a cutting process, thereby dividing the printing sheet P into the first printing sheet P1 and the second printing sheet P2. Thereafter, as indicated by an arrow H5 in FIG. 13E, the controller 7 causes the print engine 3 to perform a printing process, thereby forming a printed area P2A6 with an image printed therein based on print data, on a portion of the second printing sheet P2. This printing process is performed using the at least one nozzle 32N included in the second area H2A that has been determined as the ejection nozzle(s) in S30.

The printing apparatus 1 configured as above in the third illustrative embodiment produces substantially the same effects as in the aforementioned second illustrative embodiment. In addition, the printing apparatus 1 of the third illustrative embodiment performs the determination process to determine the at least one nozzle 32N included in the second area H2A among the plurality of nozzles 32N as the ejection nozzle(s) to eject ink droplets onto the printing sheet P, based on the print data contained in the print job. Thereby, the printing apparatus 1 of the third illustrative embodiment is enabled to further improve the throughput while suppressing a reduction in the printing performance, even when performing the cutting process.

In addition, unlike the aforementioned second illustrative embodiment, the printing apparatus 1 of the third illustrative embodiment performs the printing process with the ejection nozzle(s) determined in the determination process, after the first conveyance process. Therefore, the printing apparatus 1 of the third illustrative embodiment is enabled to perform the determination process more easily than in the second illustrative embodiment. Thus, it is possible to make a load on the controller 7 lighter than in the second illustrative embodiment.

While aspects of the present disclosure have been described in conjunction with various example structures outlined above and illustrated in the drawings, various alternatives, modifications, variations, improvements, and/or substantial equivalents, whether known or that may be presently unforeseen, may become apparent to those having at least ordinary skill in the art. Accordingly, the example embodiment(s), as set forth above, are intended to be illustrative of the technical concepts according to aspects of the present disclosure, and not limiting the technical concepts. Various changes may be made without departing from the spirit and scope of the technical concepts according to aspects of the present disclosure. Therefore, the disclosure is intended to embrace all known or later developed alternatives, modifications, variations, improvements, and/or substantial equivalents.

The following shows examples of associations between elements illustrated in the aforementioned illustrative embodiment(s) and modification(s), and elements claimed according to aspects of the present disclosure. For instance, the printing apparatus 1 may be an example of a "printing apparatus" according to aspects of the present disclosure. The pick-up roller 24, the first conveyance roller 60, the second conveyance roller 62, and the discharge roller 64 may be included in a "conveyor" according to aspects of the present disclosure. The print engine 3 may be an example of a "print engine" according to aspects of the present disclosure. The cutting mechanism 100 may be an example of a "divider" according to aspects of the present disclosure. The controller 7 may be an example of a "controller" according to aspects of the present disclosure. The CPU 71 may be an example of a "processor" according to aspects of the present disclosure. The ROM 72 may be an example of a "non-transitory computer-readable storage medium" according to aspects of the present disclosure. The recording head 32 may be an example of a "liquid ejection head" according to aspects of the present disclosure. The blades 100*a* and 100*b* may be included in examples of a "dividing blade" according to aspects of the present disclosure. The cutter carriage motor 104 may be an example of a "motor" for moving the "dividing blade" according to aspects of the present disclosure. The registration sensor 106 may be an example of a "detector" according to aspects of the present disclosure. The housing 1A may be an example of a "housing" according to aspects of the present disclosure. The EEPROM 74 may be an example of a "memory" according to aspects of the present disclosure. The cutting position P1(X) may be an example of a "dividing position" according to aspects of the present disclosure. The planned cutting position PC may be an example of a "planned dividing position" according to aspects of the present disclosure.

What is claimed is:

1. A printing apparatus comprising:

a conveyor configured to convey a print medium in a conveyance direction;

a print engine configured to perform printing based on print data contained in a print job on the print medium conveyed in the conveyance direction by the conveyor;

a divider disposed downstream of the print engine in the conveyance direction, the divider being configured to divide the print medium conveyed through the print engine by the conveyor; and a controller configured to:

cause the conveyor to convey the print medium until a planned dividing position of the print medium to be divided reaches a dividing position of the divider to divide the print medium, when a first conveyance amount is larger than a second conveyance amount, wherein the first conveyance amount corresponds to a print width for an individual printing process by the print engine in the conveyance direction, and the second conveyance amount is calculated using a distance between a predetermined reference position and the dividing position of the divider and a distance between the predetermined reference position and the planned dividing position of the print medium;

after conveying the print medium until the planned dividing position of the print medium reaches the dividing position of the divider, cause the divider to divide the print medium into a first sheet and a second sheet; and cause the conveyor to convey the second sheet after the division of the print medium, to a printing position that is a print start position for a printing process by the print engine.

2. The printing apparatus according to claim 1, wherein the controller is further configured to calculate the second conveyance amount using a distance between the predetermined reference position and a leading end of the print medium in the conveyance direction.

3. The printing apparatus according to claim 1, wherein the divider comprises a dividing blade and a motor configured to move the dividing blade, and wherein the controller is further configured to cause the conveyor to convey the print medium during an acceleration period during which the controller drives the motor to accelerate the dividing blade from a stopped state to a particular moving speed.

4. The printing apparatus according to claim 1, wherein the divider comprises a dividing blade and a motor configured to move the dividing blade, and wherein the controller is further configured to cause the conveyor to convey the print medium during a deceleration period during which the controller controls the motor to decelerate the dividing blade from a particular moving speed to a stopped state.

5. The printing apparatus according to claim 1, further comprising a detector disposed upstream of the print engine in the conveyance direction, the detector being configured to detect a leading end and a trailing end of the print medium being conveyed in the conveyance direction, wherein the controller is further configured to obtain a print media length based on a result of detection by the detector, the print media length being a length of the print medium in the conveyance direction.

6. The printing apparatus according to claim 5, wherein the controller is further configured to, when having obtained a plurality of values of the print media length based on results of detection by the detector, calculate an average value of the plurality of values of the print media length and determine the calculated average value as the print media length.

7. The printing apparatus according to claim 1, further comprising:

a housing to which the divider is assembled; and a memory configured to store adjustment information representing an adjustment amount for adjusting the distance between the predetermined reference position and the dividing position of the divider according to an assembly state of the divider assembled to the housing, wherein the controller is further configured to calculate the second conveyance amount using the adjustment information stored in the memory.

8. The printing apparatus according to claim 1, wherein the controller comprises:

a processor; and a non-transitory computer-readable storage medium storing computer-readable instructions that, when executed by the processor, cause the controller to:

cause the conveyor to convey the print medium until the planned dividing position of the print medium reaches the dividing position of the divider, when the first conveyance amount is larger than the second conveyance amount;

after conveying the print medium to the dividing position of the divider, cause the divider to divide the print medium into the first sheet and the second sheet; and cause the conveyor to convey the second sheet after the division of the print medium to the printing position.

9. A non-transitory computer-readable storage medium storing computer-readable instructions executable by a processor of a printing apparatus comprising a conveyor, a print engine, and a divider disposed downstream of the print engine in a conveyance direction, the instructions being configured to, when executed by the processor, cause the printing apparatus to:

cause the conveyor to convey a print medium in the conveyance direction until a planned dividing position of the print medium to be divided reaches a dividing position of the divider to divide the print medium, when a first conveyance amount is larger than a second conveyance amount, wherein the first conveyance amount corresponds to a print width for an individual printing process by the print engine in the conveyance direction, and the second conveyance amount is calculated using a distance between a predetermined reference position and the dividing position of the divider and a distance between the predetermined reference position and the planned dividing position of the print medium;

after conveying the print medium until the planned dividing position of the print medium reaches the dividing position of the divider, cause the divider to divide the print medium into a first sheet and a second sheet; and cause the conveyor to convey the second sheet after the division of the print medium, to a printing position that is a print start position for a printing process by the print engine.

10. A method implementable on a controller of a printing apparatus comprising a conveyor, a print engine, and a divider disposed downstream of the print engine in a conveyance direction, the method comprising:

causing the conveyor to convey a print medium in the conveyance direction until a planned dividing position of the print medium to be divided reaches a dividing position of the divider to divide the print medium, when a first conveyance amount is larger than a second conveyance amount, wherein the first conveyance amount corresponds to a print width for an individual printing process by the print engine in the conveyance direction, and the second conveyance amount is calculated using a distance between a predetermined reference position and the dividing position of the divider and a distance between the predetermined reference position and the planned dividing position of the print medium;

after conveying the print medium until the planned dividing position of the print medium reaches the dividing position of the divider, causing the divider to divide the print medium into a first sheet and a second sheet; and causing the conveyor to convey the second sheet after the division of the print medium, to a printing position that is a print start position for a printing process by the print engine.

* * * * *